United States Patent
Moshrefzadeh et al.

(10) Patent No.: US 6,417,966 B1
(45) Date of Patent: Jul. 9, 2002

(54) REAR PROJECTION SCREEN USING INTERNAL REFLECTION

(75) Inventors: Robert S. Moshrefzadeh, Oakdale; Patrick A. Thomas, Maplewood, both of MN (US); John C. Nelson, The Sea Ranch, CA (US); Theodore W. Hodapp, St. Paul, MN (US); Hsin-Hsin Chou, Woodbury, MN (US); Richard J. Pokorny, Maplewood, MN (US); Raghunath Padiyath, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/348,809

(22) Filed: Jul. 7, 1999

(51) Int. Cl.$^7$ .......................... G03B 21/60; G03B 21/56
(52) U.S. Cl. ........................................ 359/453; 359/460
(58) Field of Search ................................ 359/453, 456, 359/457, 460

(56) References Cited

U.S. PATENT DOCUMENTS

| | | | | |
|---|---|---|---|---|
| 2,207,835 A | * | 7/1940 | Sukumlyn ........................ 88/24 |
| 2,738,706 A | | 3/1956 | Thompson .................. 359/456 |
| 3,218,924 A | | 11/1965 | Miller ......................... 359/456 |
| 3,279,314 A | | 10/1966 | Miller ......................... 359/453 |
| 4,418,986 A | | 12/1983 | Yata et al. ................... 359/456 |
| 4,443,814 A | * | 4/1984 | Mori et al. .................... 358/60 |
| 4,468,092 A | | 8/1984 | Inoue et al. ................. 359/457 |
| 4,573,764 A | | 3/1986 | Bradley ...................... 359/453 |
| 4,605,283 A | | 8/1986 | Stanton ....................... 359/453 |
| 4,688,093 A | * | 8/1987 | Van Der Staak et al. ... 350/128 |
| 4,936,652 A | | 6/1990 | Clausen et al. ............. 359/456 |
| 4,993,806 A | * | 2/1991 | Claussen et al. ........... 350/128 |
| 5,005,945 A | * | 4/1991 | Van De Van ............... 350/128 |
| 5,428,476 A | | 6/1995 | Jensen et al. ............... 359/457 |
| 5,768,014 A | | 6/1998 | Lee ............................. 359/457 |

FOREIGN PATENT DOCUMENTS

| | | |
|---|---|---|
| EP | 0 783 133 A1 | 7/1997 |
| JP | 62108232 | 5/1987 |
| JP | 62286030 | 12/1987 |
| JP | 63080241 | 4/1988 |
| JP | 60079343 | 5/1998 |

* cited by examiner

*Primary Examiner*—Christopher Mahoney
(74) *Attorney, Agent, or Firm*—Stephen W. Buckingham; Altera Law Group, LLC

(57) ABSTRACT

An optically dispersing film for a rear projection system includes reflecting surfaces disposed so as to reflect light passing therethrough into at least one dispersion plane. The reflecting surfaces are formed by structures, of a first refractive index, disposed within a layer of material having a second refractive index. The structures have light absorbing bases at the viewing side of the film. In some embodiments, the reflecting surfaces are disposed at one or more angles so as to reflect light into a number of different directions. In other embodiments, the layer of material having the second refractive index includes diffusing particles that diffuse the light. The film permits the asymmetric dispersion of image light in a rear projection system, so that the light may be selectively directed towards the viewer.

69 Claims, 16 Drawing Sheets

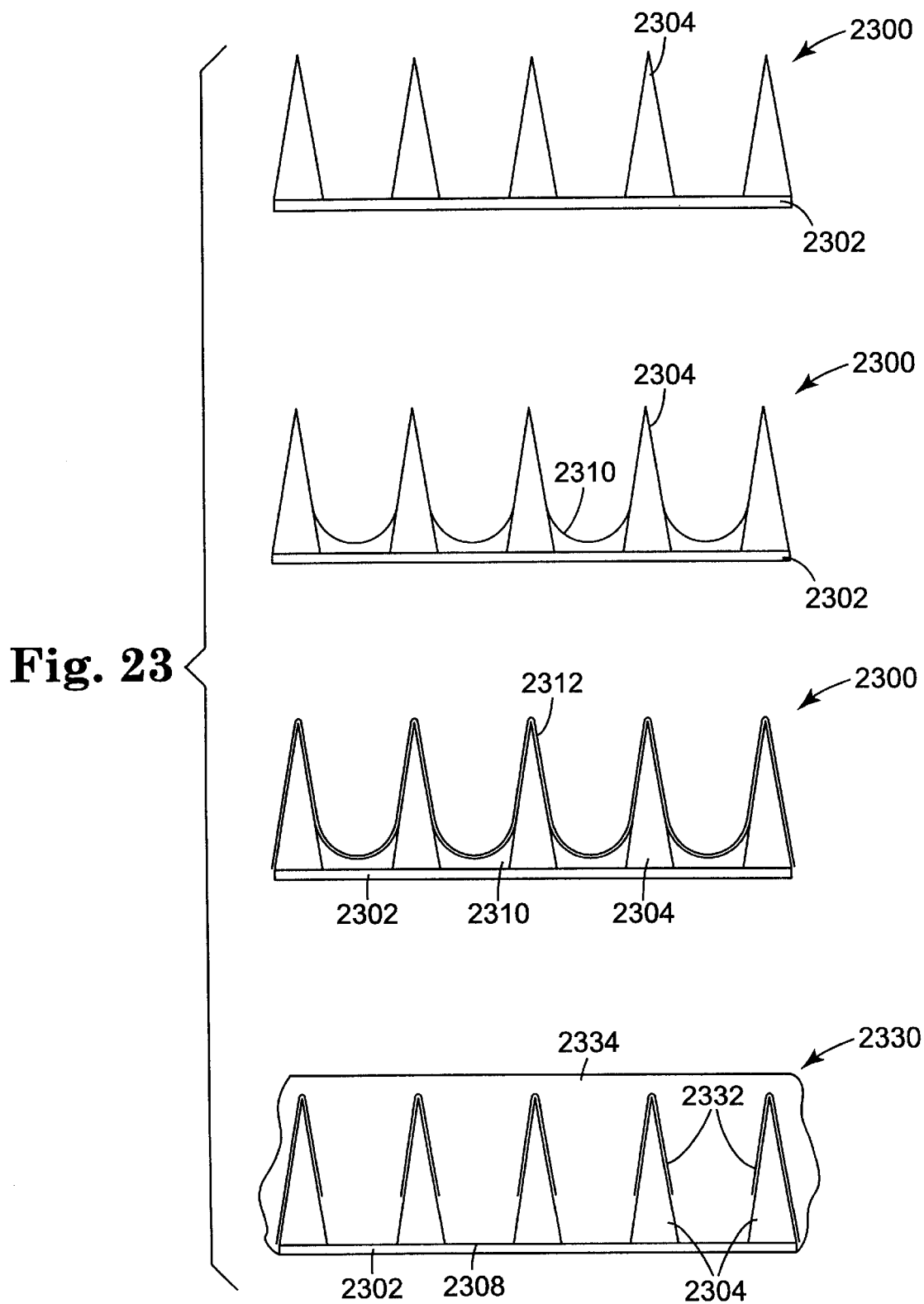

REAR PROJECTION SCREEN USING INTERNAL REFLECTION

BACKGROUND

The present invention is directed generally to a rear projection screen and more particularly to a rear projection screen that incorporates totally internally reflecting structures to disperse the light passing through the screen.

Rear projection screens are generally designed to transmit an image projected onto the rear of the screen into a viewing space. The viewing space of the projection system may be relatively large (e.g., rear projection televisions), or relatively small (e.g., rear projection data monitors). The performance of a rear projection screen can be described in terms of various characteristics of the screen. Typical screen characteristics used to describe a screen's performance include gain, viewing angle, resolution, contrast, the presence of undesirable artifacts such as color and speckle, and the like. It is generally desirable to have a rear projection screen that has high resolution, high contrast and a large gain. It is also desirable that the screen spread the light over a large viewing space. Unfortunately, as one screen characteristic is improved, one or more other screen characteristics often degrade. For example, the horizontal viewing angle may be changed in order to accommodate viewers positioned at a wide range of positions relative to the screen. However, increasing the horizontal viewing angle may also result in increasing the vertical viewing angle beyond what is necessary for the particular application, and so the overall screen gain is reduced. As a result, certain tradeoffs are made in screen characteristics and performance in order to produce a screen that has overall acceptable performance for the particular rear projection display application.

Thus, there remains a need for screens that have improved overall performance while meeting the minimum performance criteria necessary for the rear projection display application in which the screen is used.

SUMMARY OF THE INVENTION

Generally, the present invention relates to a light dispersing film for a rear projection screen and its method of manufacture. The film disperses light passing therethrough by reflecting the light off reflecting surfaces disposed within the film. The reflecting surfaces are formed at the surfaces of structures within the film.

In one particular embodiment, the light dispersing film includes a first layer formed from a first material having a first refractive index, the first layer having first and second opposing sides and a first optical axis normal to the first side. The first layer includes structures formed from a second material having a second refractive index smaller than the first refractive index. The structures have bases at the second side with one or more side walls extending towards the first side. First internal reflecting surfaces are formed by interfaces between the first and second materials. The structure bases include a light absorbing material, and optically transmitting areas of the second side are defined between the structure bases. The first internally reflecting surfaces form reflecting units that asymmetrically disperse light through respective optically transmitting areas. The first reflecting surfaces form surfaces disposed at at least two angles relative to the first optical axis.

In another particular embodiment, the light dispersing film includes a first layer formed from a first material having a first refractive index, the first layer having first and second opposing sides and a first optical axis normal to the first side. The first layer includes structures formed from a second material having a second refractive index smaller than the first refractive index. The structures have bases at the second side with one or more side walls extending towards the first side. First internal reflecting surfaces are formed by interfaces between the first and second materials. The structure bases include a light absorbing material, and optically transmitting areas of the second side are defined between the structure bases. The first internally reflecting surfaces form reflecting units that asymmetrically disperse light through respective optically transmitting areas. The first reflecting surfaces are disposed to reflect light to selected directions within a dispersion plane.

In another particular embodiment, the light dispersing film includes a first layer formed from a first material having a first refractive index, the first layer having first and second opposing sides and a first optical axis normal to the first side. The first layer includes structures formed from a second material having a second refractive index smaller than the first refractive index. The structures have bases at the second side with one or more side walls extending towards the first side. First internal reflecting surfaces are formed by interfaces between the first and second materials. The structure bases include a light absorbing material, and optically transmitting areas of the second side are defined between the structure bases. The first reflecting surfaces form surfaces disposed at two or more angles relative to the optical axis. All light reflected by the first reflecting surfaces is reflected at dielectric-dielectric interfaces.

In another particular embodiment, a film for a rear projection screen includes a substrate layer, having a first substrate layer side. Structures, formed from a first material having a first refractive index, are disposed with structure bases on the first substrate layer side. Sidewalls of the structures extend in directions away from the substrate. Structure bases are formed of light absorbing material. Clear areas are defined on the first substrate layer side between the structure bases. An overlayer, formed from a second material having a second refractive index larger than the first refractive index, is disposed over the structures and the clear areas of the first substrate layer side. Interfaces between the overlayer and the sidewalls form internally reflecting surfaces for light propagating within the overlayer towards the substrate in a direction substantially perpendicular to the substrate.

In another particular embodiment, a light diffusing film for a rear projection screen includes a first layer formed from a first material having a first refractive index, having first and second opposing sides and an optical axis normal to the first side. The first layer includes structures formed from a second material having a second refractive index smaller than the first refractive index. The structures have bases at the second side with one or more side walls extending towards the first side to define first reflecting surfaces. The structure bases include a light absorbing material and optically transmitting areas of the second side are defined between the structure bases. A bulk diffuser is disposed to disperse light passing through the optically transmitting areas of the second side.

In another particular embodiment, a light dispersing film for a rear projection screen includes a first layer formed from a first material having a first refractive index, the first layer having first and second opposing sides and a first optical axis normal to the first side. The first layer includes structures formed from a second material having a second refractive index smaller than the first refractive index, the structures having bases at the second side with at least two side walls extending towards the first side. Internal reflecting surfaces are formed by interfaces between the first and second materials. The structure bases include a light absorbing material, and optically transmitting areas of the second side are defined between the structure bases. At least one structure has at least one of the two sidewalls disposed at an angle selected to be parallel to diverging light passing through the film from an image light source positioned on the first optical axis.

In another particular embodiment of a light dispersing film, the film includes a first film having first and second opposing sides. the first film has a first refractive index within a first refractive index range. The first film includes structures formed from a structure material having a second refractive index smaller than the first refractive index range. The structures have bases at the second side with one or more side walls extending towards the first side. First internal reflecting surfaces are formed by interfaces between the structure material and the material of the first film. The structure bases include a light absorbing material, and optically transmitting areas of the second side are defined between the structure bases. The first refractive index of the first film proximate the first side is different from the first refractive index of the first film proximate the second side.

In another particular embodiment, the light dispersing film includes a first layer formed from a first material having a first refractive index, the first layer having first and second opposing sides and a first optical axis normal to the first side. The first layer includes structures formed from a second material having a second refractive index smaller than the first refractive index. The structures have bases at the second side with one or more side walls extending towards the first side. Metal coatings are disposed on at least portions of the side walls between the first and second materials to form first reflecting surfaces. The structure bases include a light absorbing material, and optically transmitting areas of the second side are defined between the structure bases. The first reflecting surfaces form reflecting units that asymmetrically disperse light through respective optically transmitting areas. A bulk diffuser is disposed within the first material to disperse light passing through the optically transmitting areas of the second side.

A particular method for manufacturing an optical film includes casting and curing structures on a substrate, the structures being formed from a first material having a first refractive index and with optically absorbing bases on the substrate, and open substrate areas being defined between adjacent structures on the substrate. The method also includes overcoating the structures and the open substrate areas with a second material having a second refractive index greater than the first refractive index, so as to form reflecting surfaces at interfaces between the first and second materials. The reflecting surfaces are disposed to reflect light, propagating through second material substrate in a direction substantially parallel to an optical axis of the film, towards open substrate areas.

Another particular method of forming an optical film includes forming grooves on a first side of a film of first material having a first refractive index, with open areas of the first side between the grooves. The method also includes forming an optical scatterer on the open areas of the first side, and filling the grooves with a second material having a second refractive index smaller than the first refractive index, the second material being optically absorbing.

Another particular method of forming an optical film includes casting and curing structures on a substrate, the structures being formed from a first material and with optically absorbing bases on the substrate, and open substrate areas being defined between adjacent structures on the substrate. The method also includes disposing a metallic layer over at least part of the structures to form reflecting surfaces and overcoating the metallic layer and the open substrate areas with a second material. The reflecting surfaces are disposed to reflect light, propagating through second material substrate in a direction substantially parallel to an optical axis of the film, towards open substrate areas.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 23 illustrates method steps for forming a metallically reflecting film according to an embodiment of the present invention.

Figure 1:
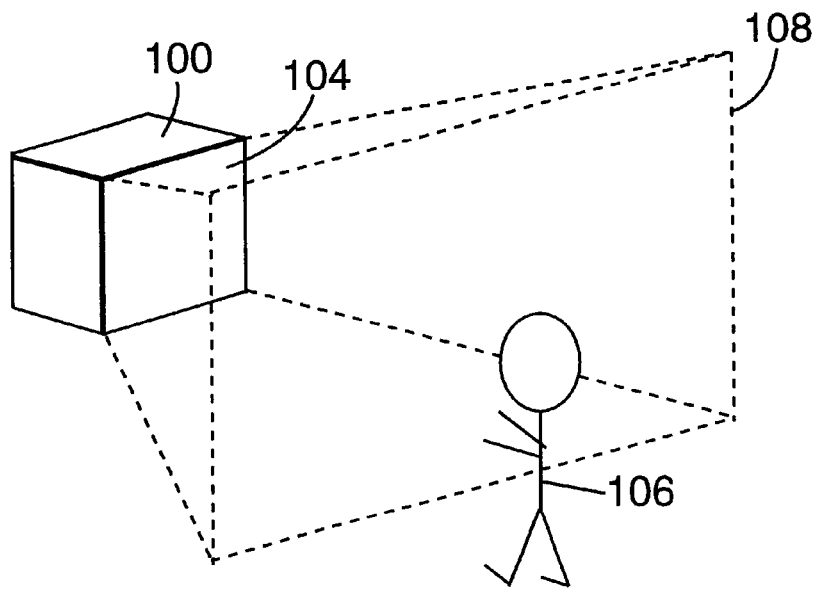
FIG. 1 illustrates a rear projection display.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally applicable to a number of different screen assemblies and is particularly suited to screen assemblies used in rear projection systems. In particular, the present invention is advantageous in applications where the most likely position of the viewer, or viewers, is known: the invention is useful in directing light from all portions of the screen to the most likely viewer position, to increase brightness uniformity across the screen.

The rear projection display 100 is described with reference to FIGS. 1 and 2. The display includes an image projector 102 that projects an image onto the rear side of a screen 104. The image is transmitted by the screen 104 so that a viewer 106, located at some point beyond the screen 104, can see the image projected through the screen 104. The rear projection display 100 may be, for example, one or more rear projection televisions, or one or more rear projection computer monitors, or any other rear projection displaying apparatus.

In accordance with one embodiment of the invention, an image projector 102, for example a liquid crystal display-based light projector, or any other suitable type of image projector, can be used in the rear projection display 100 to project an image onto the rear surface of the screen assembly 104. The rear projection display may vary in size from relatively small data monitors, to large screen televisions and video walls. The projection display 100 may also rely on a folded image projection path within its housing, such as the various projection systems described in European Patent Application EP783133, entitled "Projecting Images", the contents of which are incorporated herein by reference. As will be appreciated from the descriptions below, such systems particularly benefit from the use of the various screen assemblies described herein below.

A more detailed description of the various screen characteristics is now provided. One important screen characteristic is gain. The gain of a screen represents the screen's brightness as a function of viewing angle. The gain is typically calibrated using an ideal Lambertian reflector with the gain of the ideal Lambertian standard set at 1 for all angles. The peak gain of a screen (or screen element) corresponds to the highest gain at some angle. For example, the peak gain of a bulk diffuser screen, illuminated from behind at normal incidence, is typically observed for the light transmitted through the screen at an angle normal to the screen surface.

Another important screen characteristic is viewing angle. The viewing angle of screen, as used herein, is the angle at which the gain of the screen drops to half of the peak gain. In many situations, the viewing angle corresponds to the difference between the angle of maximum luminance and the angle at which the luminance of the transmitted image drops to half of the maximum luminance of the screen. Typically the maximum luminance occurs for light transmitted in a direction normal to the screen surface.

The particular application of a rear projection system determines the desired viewing angle. It is typically advantageous to control the angular dependence of the screen's luminance by directing light to that region where the viewer is most likely to be situated. For example, where the rear projection display is a data monitor, the viewer is typically positioned centrally relative to, and within approximately one to three feet from, the screen. The viewer's eyes may be positioned above a line normal to the center of the screen, but the viewer typically does not view the screen from a distance as much as one or two feet above the screen. Furthermore, for reasons of privacy or security, it may be desirable to reduce the luminance emerging from the screen at an angle of e.g. 30° or more relative to a normal to the screen. This reduces the possibility that someone positioned far away from the axis of the screen, and perhaps having no authority to view the contents of the screen, sees the information on the screen.

Another application for a rear projection screen is in a home television system, where it is generally desired to direct the angular dependence of the screen's luminance over large horizontal angles, since it is common for viewers to be seated at a position other than directly in front of the television screen. On the other hand, few viewers view the television screen from a position significantly above or below the screen, and therefore it is commonly desired to reduce the screen's viewing angle in the vertical direction. Accordingly, the preferred viewing angles for a television are typically smaller in the vertical direction than in the horizontal direction. In certain applications, the vertical divergence of the light from a television screen may preferably be tilted downwards relative to a normal from the television screen. This accommodates, for example, viewers watching the television from the floor. In this example, it is not as important to deflect light upwards from the television screen, since viewers typically do not stand to watch television for any length of time.

An important characteristic of a screen is its ability to avoid unwanted color or speckle effects. In certain screens color may be observed as a random pattern of differently colored, pixel-like spots on the screen. Such color artifacts typically result from wavelength-dependent effects, such as scattering in which different wavelengths are scattered in different directions or with different efficiency. As a result of the wavelength-dependent effects, different colors may become physically separated and observable on the viewer side of the projection screen. Scattering surfaces, such as matte-finished surfaces are particularly susceptible to problems of speckle and color.

The resolution provided by the rear projection screen is becoming more important as rear projection displays are used in applications with increasingly higher resolution requirements, for example high definition television. The resolution of a screen is generally defined as a measure of the finest detail that can be distinguished in an image projected on the screen.

Figure 2A:
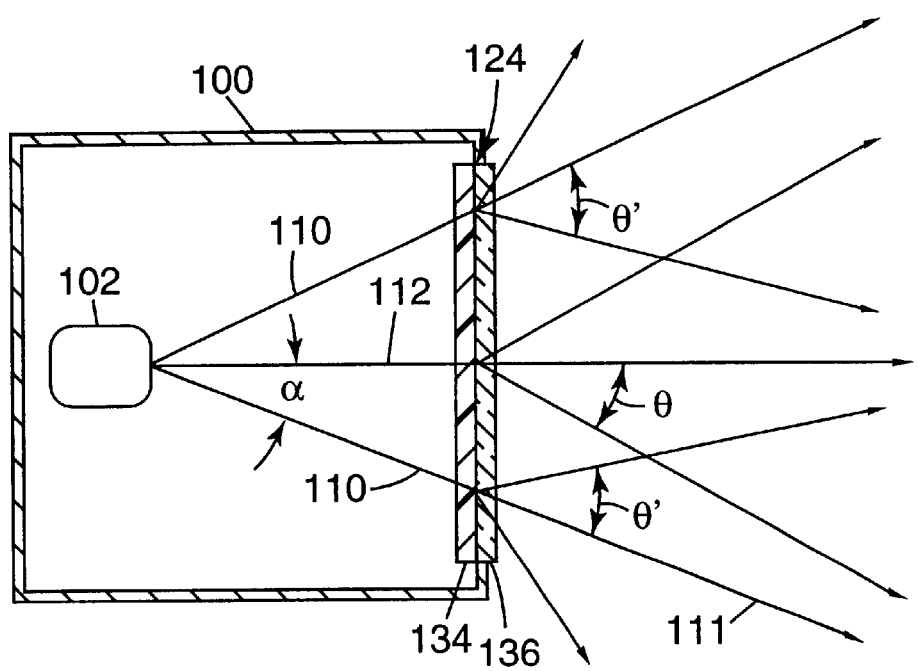
FIGS. 2A and 2B illustrate schematic cross-sectional views of particular embodiments of rear projection displays.

Considering now the illustration of FIG. 2A, the image light 110 produced by the image projector 102 is directed to the screen assembly 124. The screen assembly 124 typically includes several different layers for controlling the image seen by the viewer, including a dispersing layer 134 and a glass plate 136 to provide support. The dispersing layer 134 disperses, or diffuses, light passing through a particular point of the screen into a cone angle, so that a viewer on the far side of the screen can detect image light from that particular point. It will be appreciated that the dispersing layer 134 typically disperses light from all points across the screen so that the viewer can see the entire image projected onto the screen assembly 124 by the image projector 102.

Here, the term "disperse" is employed to refer to any process that changes the direction of the image light, for example scattering, diffusion, refraction or reflection, or any other approach, which produces a viewing angle in one or more directions. The use of the term does not imply wavelength dependent characteristics. The term "dispersion angle" is the angle through which light is dispersed, e.g. scattered, refracted or reflected, relative to the incident direction. Dispersion may be symmetric, or isotropic, as is typically obtained using a bulk diffuser. Dispersion may also be asymmetric, or non-isotropic, for example where the viewing angle in the vertical direction is different from the viewing angle in the horizontal direction. A "dispersion plane" refers to a geometric plane of dispersion. For example, light that is dispersed by a film in a horizontal direction may be referred to as being dispersed within a horizontal dispersion plane, or in a direction parallel to horizontal dispersion plane.

The on-axis ray of light 112 is dispersed by the dispersing layer 134 to produce a viewing angle of 2θ. The off-axis light rays 110 from the image projector 102 illuminate the edge of the screen assembly 124, and are separated from the on-axis ray 112 by an angle of α. When the off-axis rays 110 pass through the dispersing layer, they are dispersed by ±θ' about a ray 111 that is at an angle α relative to a screen normal. The angle θ' may or may not be equal to angle θ, as the specifics of the scattering event will depend upon other optical properties of the rear projection screen.

Figure 2B:
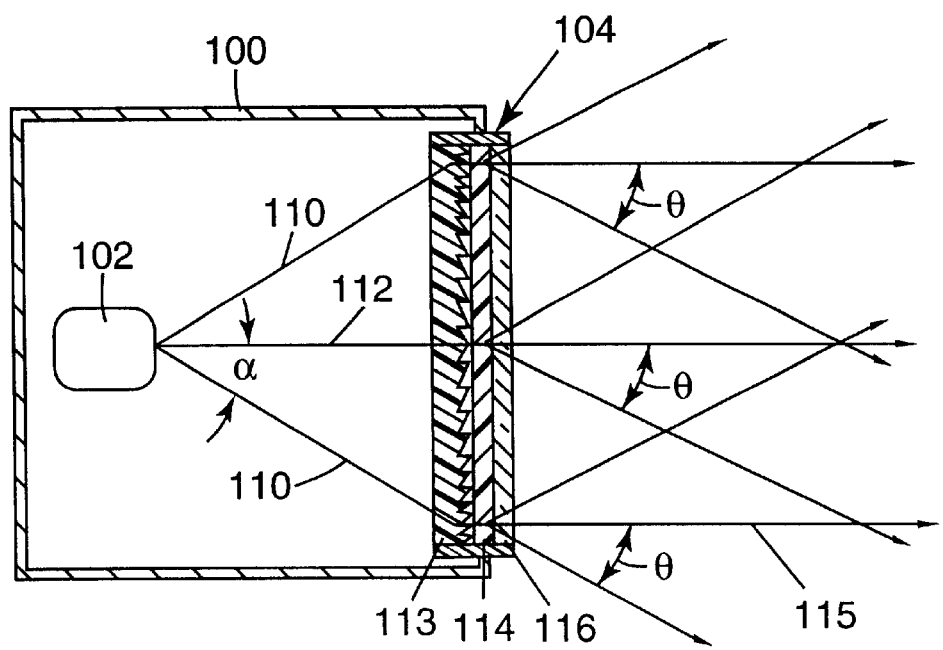

Another screen assembly 104 is illustrated in FIG. 2B, in which light 110 from the image projector 102 is collimated by a Fresnel lens 113 before being incident on the dispersing layer 114. The dispersing layer 114 is supported on a support layer 116, which may be, for example, a glass screen. In this case, the dispersed light transmitted through the edge of the screen 104 is dispersed about a ray 115 that is normal to the screen. One advantage of the screen assembly 104 over the screen assembly 124 without any Fresnel lens is that the angle through which light from the edge of the screen has to be dispersed in order to be detected by an on-axis viewer is reduced. Since the intensity of dispersed light generally decreases with increased angle, the image seen by a viewer on the screen assembly 104 having a Fresnel lens typically appears to be more uniformly intense across the screen than where no Fresnel lens is used.

Figure 3:
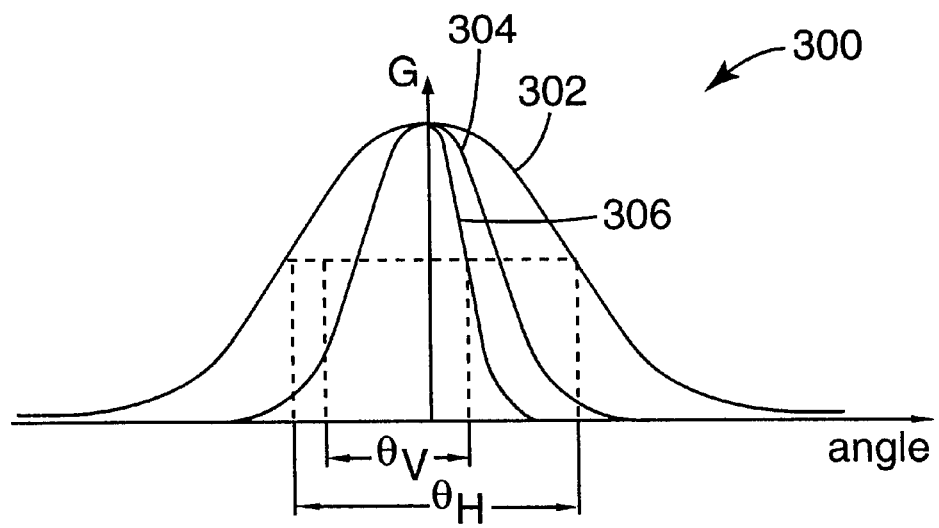
FIG. 3 shows curves of optical gain plotted against angle of view, for vertical and horizontal angles.

One example of a desired gain characteristic for a television screen is illustrated in FIG. 3. The figure illustrates two curves, 302 and 304, that relate gain to angle of viewing, θ, as might be obtained for a screen used in a television. The broader curve 302 illustrates the gain, G, as a function of angle, θ, in a horizontal direction. In other words, curve 302 describes the brightness of the screen perceived by a viewer as the viewer moves sideways away from the screen. The horizontal viewing angle, $\theta_H$, is the angle at which the luminance of the horizontally dispersed light falls to half of the maximum luminance.

The narrower curve 304 represents the dependence of the gain as a function of angle relative to the screen viewed in a vertical direction. As has been discussed above, it is typically desired in a television application that the image from the screen be directed vertically in a relatively narrow range of angles in order to avoid throwing away light that would otherwise illuminate the floor and ceiling. This increases the screen brightness perceived by viewers located in the expected viewing zone. The vertical viewing angle, $\theta_V$, the angle at which the light intensity is one half of the maximum intensity, is less than the horizontal viewing angle, $\theta_H$.

Accordingly, it should be appreciated that there are several applications for rear projection display screens in which the dispersion is asymmetric, in order to provide a vertical viewing angle, $\theta_V$, different from the horizontal viewing angle, $\theta_H$. Also, the viewing angle in one direction, for example the vertical direction, need not be symmetric about the axis through the screen. For example, the gain in the vertical direction may fall more rapidly with increasing angle above the screen axis than for decreasing angle below the screen axis, as is shown for curve 306, which has its peak gain at θ=0°, but which sheds more light downwards than upwards.

An important measure of screen performance is contrast. Contrast is generally the ratio of luminance of a projected white image to that of a projected black image. As such, numerical contrast numbers are dependent on the light source and the imaging optics. The contrast ratio tends to increase with increasing screen brightness and as the projected black image is made blacker. In one instance, contrast may be measured in terms of the dynamic range of the system. The dynamic range is a measure of the contrast ratio in the absence of ambient light. When a projection display is used in the presence of ambient light, some of the ambient light may be reflected from the screen. The reflected light typically includes both specular and diffuse components. The ambient reflection tends to decrease the contrast of the screen. Thus, if the screen is used in the presence of ambient light, the contrast ratio is also dependent upon the ability of the screen to absorb the ambient light: it is particularly desirable to reduce the amount of ambient reflection from the screen. Therefore, the amount of ambient reflectance provides another useful measure of screen performance.

Figure 4A:
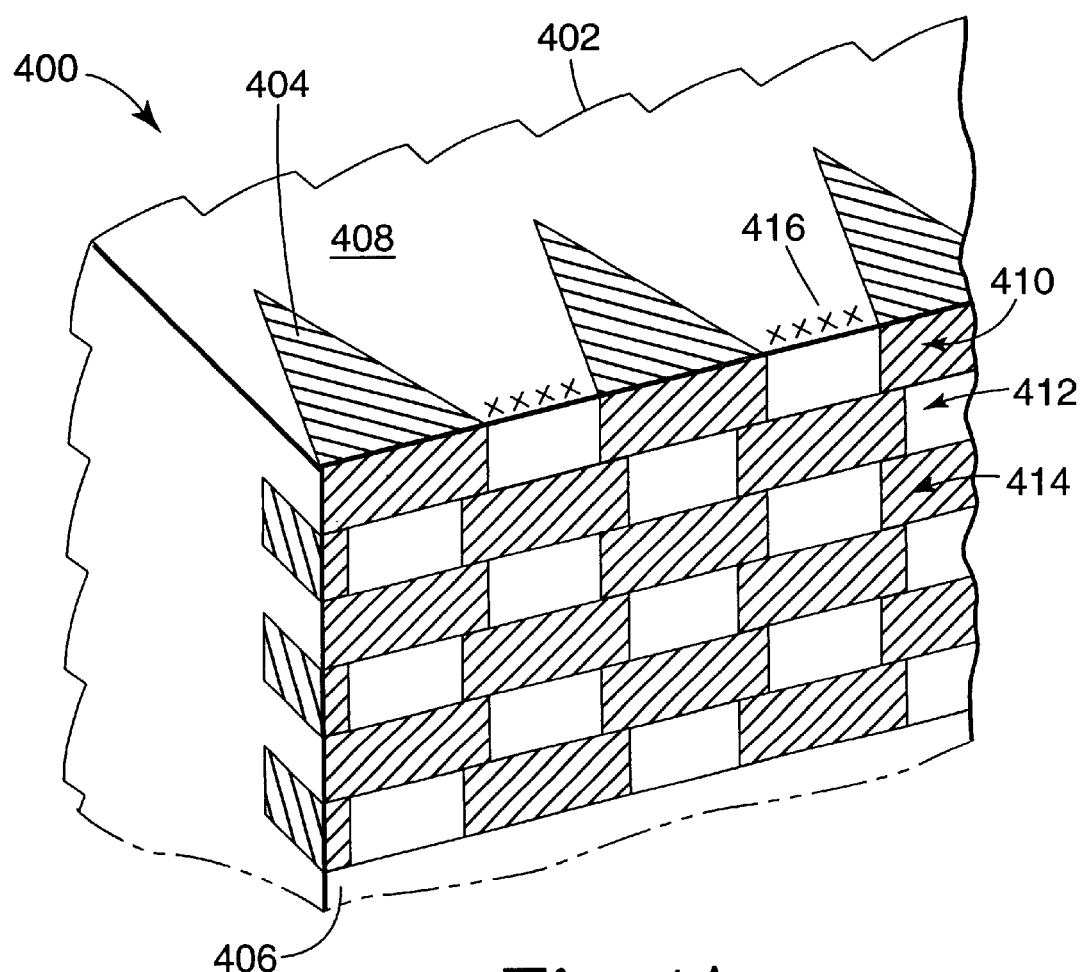
FIGS. 4A and 4B illustrate one embodiment of a light dispersing screen.

One approach to dispersing the light, discussed in U.S. Pat. No. 5,768,014 and illustrated in FIG. 4A, is to use a single layer screen 400, having a front surface Fresnel lens 402 on the input side that receives the light from the image light source. A number of refractive prisms 404 are provided on the exit surface 406 of the screen. The prisms 404 are shaped as isosceles triangular prisms, their bases flush with exit surface 406. The refractive index of the prisms 404 is lower than the refractive index of the surrounding bulk material 408. Absorbing material within the prisms 404 absorbs any light that passes into the prisms 404. The prisms 404 are arranged in layers 410, 412, and 414, with the position of the prisms 404 staggered between each layer. The clear portions 416 of the exit surface 406, between the prisms 404, are provided with a fine-mat-surface that acts as a surface scatterer.

Figure 4B:
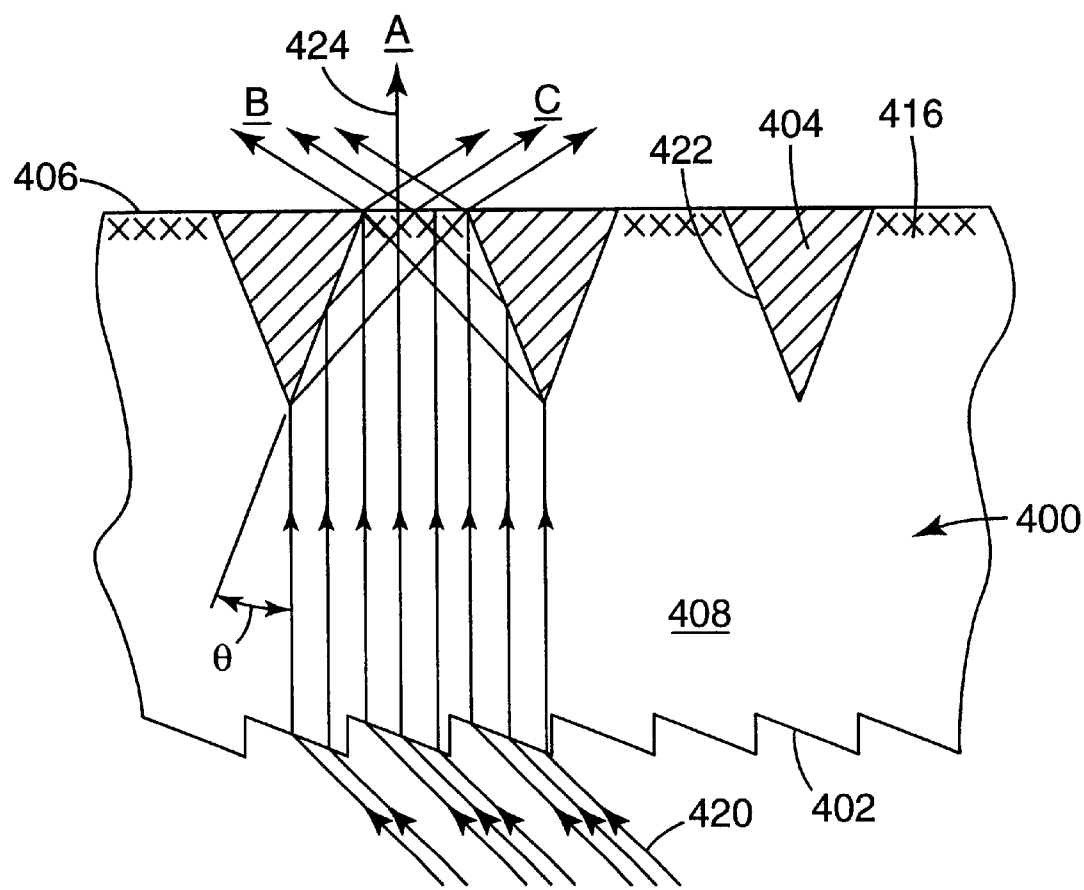

The operation of the screen 400 is explained with reference to FIG. 4B, which shows a section through the screen 400. Light 420 from the image light source is incident on the Fresnel lens 402, which collimates the light along the direction of propagation. The light then propagates towards the exit surface 406. Some of the light intercepts the interface 422 between a prism 404 and the bulk material 408. The angle of the prism apex, θ, and the difference between the refractive indices of prism 404 and the bulk material are selected so that the light is totally internally reflected at the prism interface 422 towards the clear portion 416 of the exit surface 406. The light propagates through the exit surface 406 at an angle to the surface normal, and suffers some scattering by the fine-mat-surface. Some of the light collimated by the Fresnel lens 402 is directly incident on the clear portion 416, and propagates out of the screen 400 substantially in the normal direction shown by the ray 424. Thus, total internal reflection by the prisms 404 is used to disperse the light in the horizontal direction, while the fine-mat-surface provides isotropic scattering into both the vertical and horizontal directions. The bases of the prisms 404 present light absorbing material to the viewing surface of the screen 400. Absorption of ambient light by the prism bases provides the screen contrast.

Several problems with the screen 400 remain unaddressed in U.S. Pat. No. 5,768,014. One problem is the use of the surface scatterer. If there is no isotropic scattering at the exit surface of the screen 400, then the light emerges only along three distinct directions, labeled A, B, and C. Consequently, the horizontal gain of the screen 400 has three peaks, one at zero degrees, (direction A) and the other two peaks positioned symmetrically about the center peak, corresponding to directions B and C. In order to provide a relatively smooth horizontal gain curve, and to prevent the gain profile from being dominated by the three peaks, there must be a large amount of scattering at the fine-mat-surface, i.e. the fine-mat-surface must scatter light through a relatively large angle. However, the use of a surface scatterer, particularly a surface scatterer having a sufficiently high degree of scattering to produce the vertical viewing angle and to smooth out the horizontal gain profile, results in speckle and color problems in the viewed image. The speckle resulting from a surface scatterer may be reduced by increasing the degree of scatter imparted by the scatterer. However, the requirement to increase light scattering to reduce speckle may run contrary to the amount of scatter required to produce the desired horizontal and vertical viewing angles.

Another drawback with using a surface scatterer is that the scattering properties are compromised if the film is laminated to another film. The effect of the lamination is to reduce the refractive index difference experienced by light as it passes out of the high refractive index material, and so the scattering is reduced. This may be particularly important if the surface scatterer is the only mechanism in the film for smoothing out the horizontal gain profile. Accordingly, the use of the fine-mat-surface may limit the range of performance of the screen.

Another problem with the screen 400 is that transmission through the film may be reduced if the light is internally reflected more than once. Therefore, the spacing between adjacent prisms that achieves maximum transmission is sufficiently large that light is not reflected by more than one prism. Thus, for maximum transmission, the spacing between prisms is dependent on the required viewing angle: if a larger horizontal viewing angle is required, then the inter-prism spacing is increased. However, increasing the inter-prism spacing reduces the ratio of the black area on the screen, and so the screen contrast is reduced. Thus, screen contrast is not independent of screen transmission or viewing angle.

Another problem with the screen 400 is that the method for manufacturing a film is complex, which results in increased manufacturing costs.

An important advantage of the present invention is that the dependence of the film on the use of a surface scatterer is reduced. Consequently, the present invention may be used to substantially reduce the non-uniformity of the gain profile resulting from internal reflection, thus permitting different viewing angles to be established in the horizontal and vertical directions without adversely affecting other characteristics of the film. Additionally, the limitations on the screen contrast may be reduced, thus permitting the screen contrast to be increased without limiting the viewing angle or the screen transmission. An embodiment of the present invention is a screen whose internally reflecting surfaces are disposed to reduce the large peaks in the gain curve discussed above with respect to the screen 400, i.e. to reduce the non-uniformities in the gain profile. The invention permits the designer to select reflection of image light in different directions within a dispersion plane.

Figure 5A:
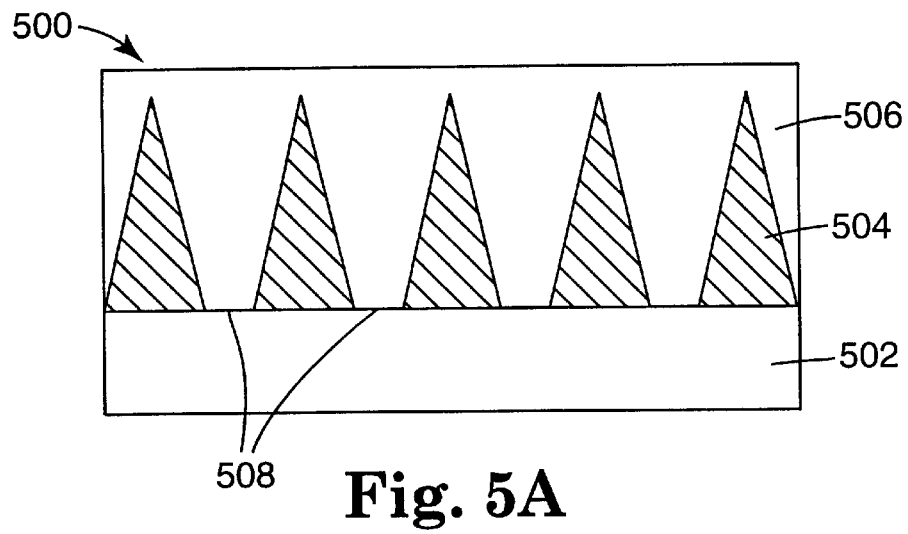
FIGS. 5A and 5B illustrate different light dispersing layers.

One particular embodiment of the present invention is illustrated in FIG. 5A. A film 500 includes a substrate layer 502 having, on one surface, triangular structures 504 that absorb light and that have a relatively low refractive index. The structures are separated, at their bases, by clear areas 508. A layer 506 of high refractive index material overlies the structures 504, filling the spaces between adjacent structures 504. The high refractive index layer 506 may be loaded with diffuser particles to act as a bulk diffuser. Bulk diffusers do not suffer from the same problems as the fine-mat-surface mentioned above. First, the speckle problem is reduced because the bulk diffuser breaks up the coherence of the light passing through the screen. Second, the color problem is reduced because multiple-scattering events tend to average out the wavelength dependence of the scattering event. Third, the bulk diffuser can be laminated to other layers without adversely affecting its light dispersing properties.

The structures 504 may be formed as short structures and arranged in a checkered pattern in a film, for example like the pattern illustrated in FIG. 4A. The structures may also be formed as ribs that extend across substantially the entire width of the film, or as two dimensional structures that have reflective surfaces arranged to reflect light in directions parallel to more than one dispersion plane.

Figure 5B:
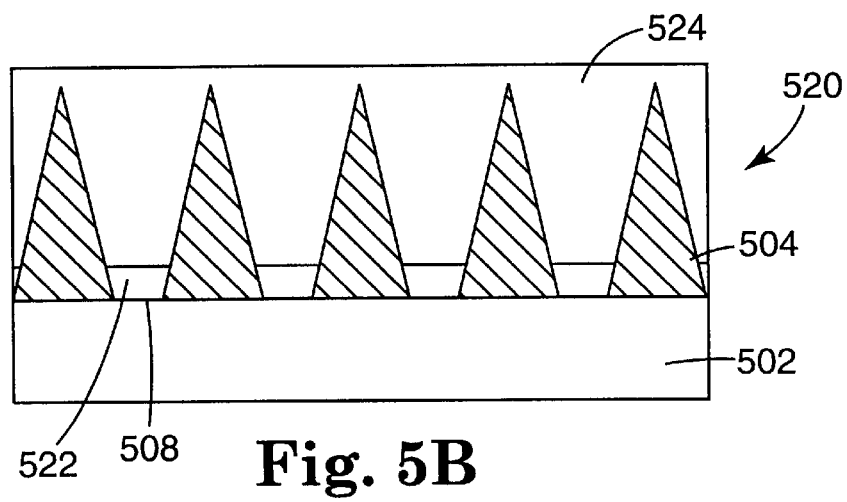

Another type of screen layer 520 is illustrated in FIG. 5B. Here, the substrate 502 and the structures 504 are the same as in the first dispersing layer 500. A layer of bulk diffuser 522 is positioned at the bottom of the valleys between structures 504, over the clear areas 508. A top layer 524 of high refractive index material is positioned over the structures 504 and bulk diffuser layer 522. In another embodiment (not illustrated) the density of diffusing particles may be graded so that there is less diffusion close to the top of the structures and there is increased diffusion close to the structure bases. Also, the density of diffusing particles may be graded to produce increased diffusion close to the top of the structures and less diffusion close to the structure bases.

Figure 5C:
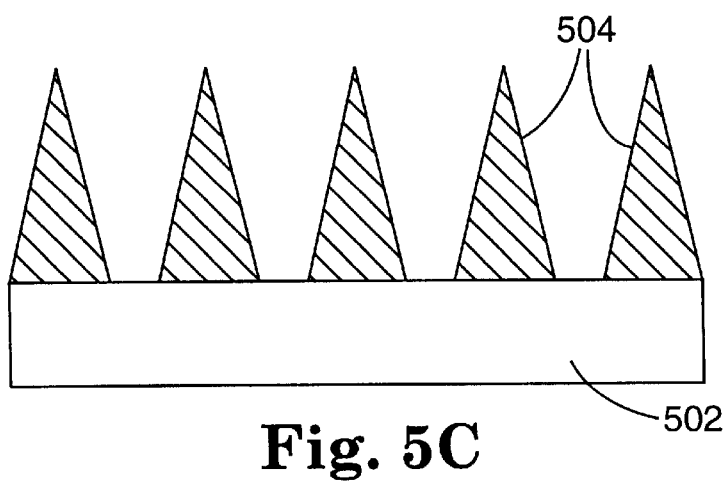
FIG. 5C illustrates a partially fabricated light dispersing layer.

A dispersing layer 500 was manufactured by forming the structures 504 as rib-like structures across a polycarbonate substrate film (DE6-2 manufactured by Bayer) using a cast and cure method, to produce the article shown in FIG. 5C. The structures 504 were formed from a UV cured urethane-acrylate resin (photomer 6010) that cured to a refractive index of about 1.51. The resin was mixed with carbon black to a level of about 1500 ppm by weight. The structures were formed with a pitch of about 100 μm: the base of each structure 604 had a width of 80 μm, and the clear area 608 had a width of 20 μm. The apex angle, also known as inclusion angle, of each structure 604 was 30°, and the height was about 150 μm.

The high refractive index layer 506 was formed by planarizing using a bead-loaded resin. The resin was a UV curable, brominated acrylate blend with a cured refractive index of 1.59, and was loaded with acrylate-polystyrene beads to provide isotropic diffusion. The average bead diameter was about 5 μm, and the bead refractive index was 1.54. A release liner was in place during the planarization and curing. The finished article was as the dispersing layer 500 shown in FIG. 5A. Different bead loading levels of 0%, 3%, 7% and 15% by weight were used to add different amounts of isotropic scattering.

Light incident on the interfaces between the high refractive index layer 506 and the structures 504 is largely totally internally reflected, since the angle of incidence on the interface is greater than the critical angle, $\theta_c$, given by $\theta_c = \sin^{-1}(n_L/n_H)$ where $n_L$ is the refractive index of the structure 504 and $n_H$ is the refractive index of the high index layer 506. However, some of the absorbing particles may be present at the interfaces between the structures 504 and the high index layer 506, which may prevent total internal reflection from taking place. Accordingly, a large fraction of the light incident on the interfaces between the between the structures 504 and the high index layer 506 may be totally internally reflected, while a small fraction of the light is not totally internally reflected, and may be partially reflected or absorbed. Light reflected from the interfaces is referred to as being internally reflected. Internal reflection arises predominantly from the interface between two dielectric materials.

Figure 6A:
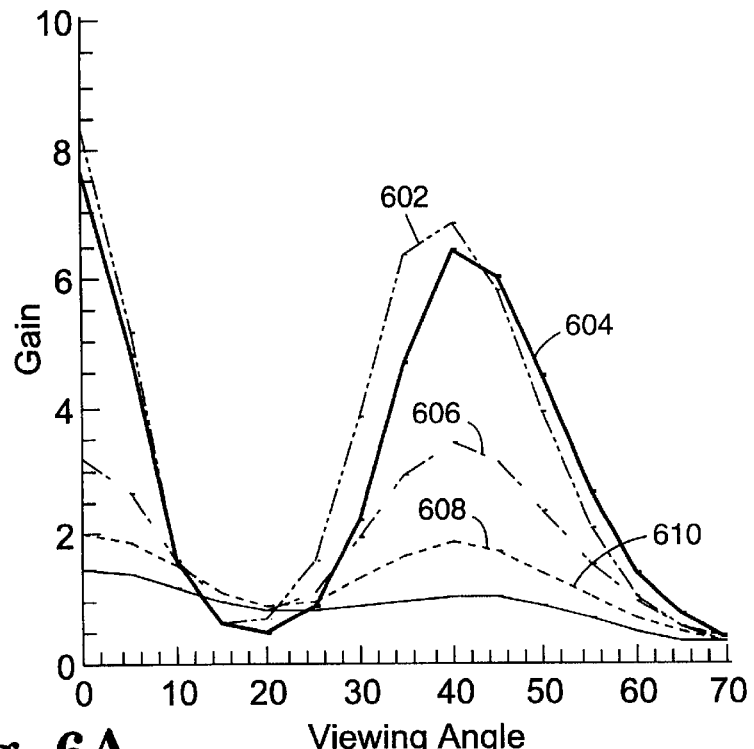
FIGS. 6A and 6B respectively illustrate gain profiles of the light dispersing layer illustrated in FIG. 6A.
Figure 6B:
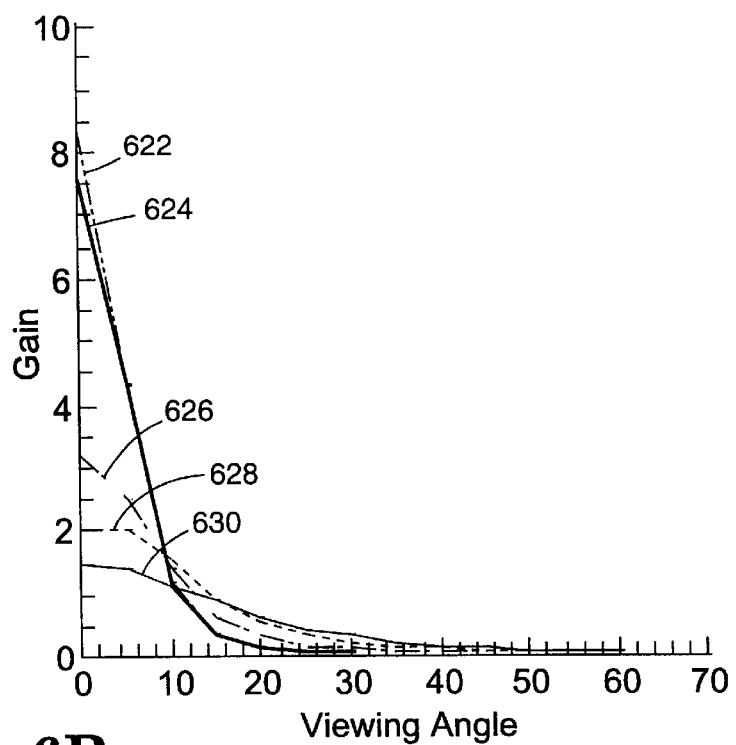

The horizontal and vertical gain of the light dispersing layer 500 are shown in FIGS. 6A and 6B respectively, for collimated light incident on the input face of the light dispersing layer 500 at normal incidence. In FIG. 6A, the top curves 602 and 604 show the gain in the horizontal direction where the bead loading was 0%. The other curves 606, 608 and 610 respectively show the horizontal gain for bead loading of 3%, 7% and 15%. It can be seen that there is a dip in the gain at about 20° for all values of isotropic scattering, while there is an off-center peak at about 40°. This peak is caused by light that is internally reflected by the structures 504, and corresponds to light emitted in the direction "B" shown in FIG. 4B. The dip and off-center peak are particularly noticeable at low values of bead loading, and are normally deleterious to the operation of the screen. The viewer's preference is typically for the screen brightness to fall off continuously as angle of viewing is increased from normal incidence viewing, rather to fall to a low value and then rise again as the angle increases. It was also found that the amount of light transmitted by the dispersing layer 600 was not significantly affected by the degree of bead loading: the transmission with 0% loading was less than 10% greater than the transmission when the loading was 15%.

The equivalent set of vertical gain curves is shown in FIG. 6B, where curves 622, 624, 626, 628 and 630 correspond to horizontal gain curves 602, 604, 606, 608 and 610 respectively. The vertical gain is reduced, and the vertical viewing angle is increased, as the amount of isotropic scattering is increased, with the result that the vertical viewing angle is at its highest when the horizontal gain curve is at its smoothest. It will be appreciated that the dispersing layer 500 suffers from a problem similar to that of the screen 400 in that a high degree of isotropic scattering is required to ensure that the horizontal gain is smooth. However, since this screen uses bulk diffusion, rather than surface scattering, this embodiment has advantages of reduced speckle and color separation compared to the screen 400, and it can be laminated to another layer without its light scattering characteristic being adversely affected.

A number of approaches may be used to reduce the formation of the dip and the off-center peak in the gain of a screen that uses internally reflecting structures for dispersing light. Some of these approaches use reflecting structures that present reflecting surfaces lying at more than one angle to an axis passing through the screen. For example, different structures may have different apex angles, or a single structure may have a faceted reflecting surface or a curved reflecting surface.

Figure 7A:
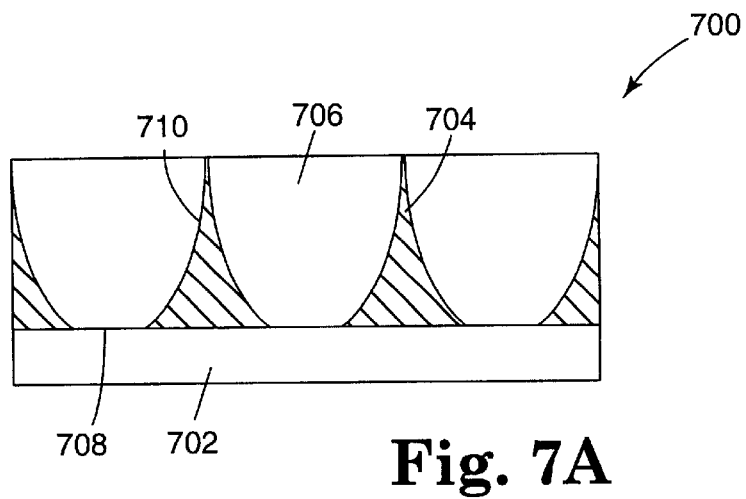
FIGS. 7A and 7B illustrate a light dispersing layer having curved reflecting structures according one embodiment of the present invention.

One particular embodiment of an internally-reflecting, dispersing layer 700 is illustrated in FIG. 7A. Light absorbing structures 704 made from a low refractive index material are positioned on a surface of a substrate 702. The structures 704 are overcoated with a high refractive index layer 706 that may be loaded with diffusive beads to provide dispersion in both the horizontal and vertical directions. Open areas 708 lie between the bases of the structures 704. The internally reflecting surfaces 710 of the structures are not straight, as in previously described embodiments. Instead, the surfaces 710 are curved. As a result, and ignoring any isotropic dispersion for the moment, the light that is internally reflected by the structures 704 passes through the open areas 708 in a range of different directions. This contrasts with the embodiment illustrated, for example in FIG. 4A, in which the internally reflected light passes through the clear portions 416 in a single direction, resulting in the large off-center gain peak.

Figure 7B:
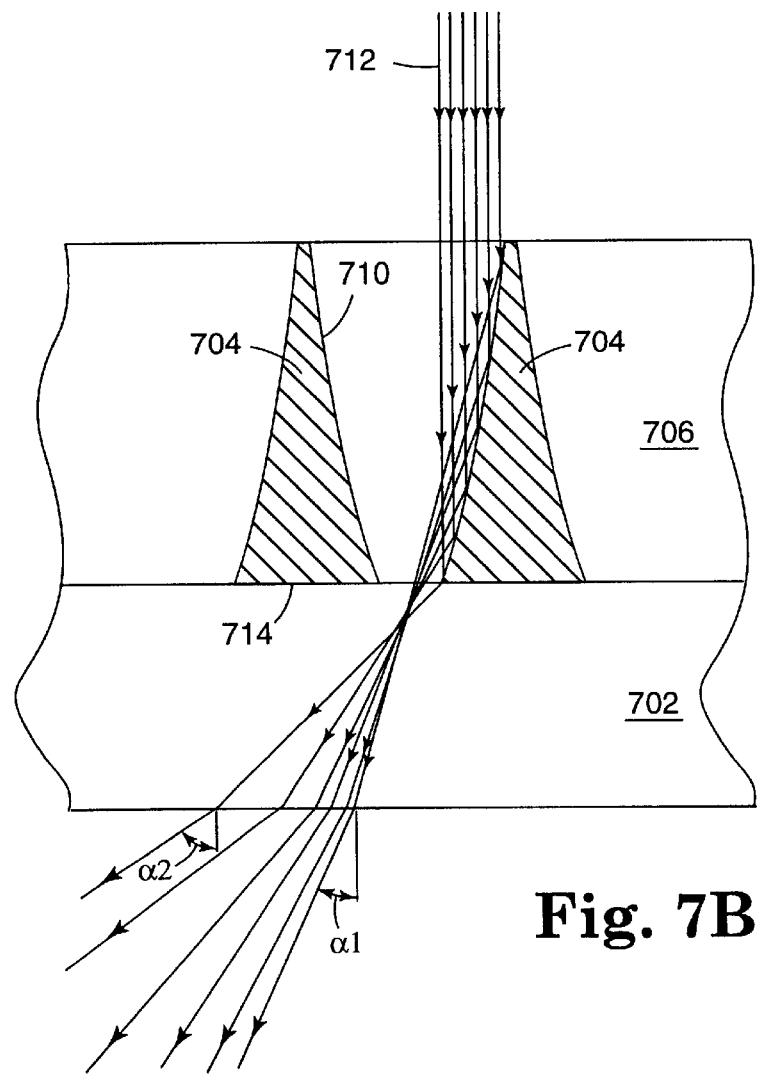

This is illustrated in FIG. 7B, which shows collimated light 712 entering the valley between two adjacent structures 704. The structure surfaces 710 in this example have a parabolic shape, but any suitable curve may be used for the surfaces. The portion of the light that is incident on the top portion of the structure 704 is reflected at a highly glancing angle, and so is deviated through a relatively small angle and emerges from the substrate 702 at an angle of α1. The surface 710 close to the base 714 of the structure 704 lies at a larger angle relative to the direction of the incoming light than at the top of the structure 704, and so the light incident on the surface 710 close to the base 714 is reflected at a larger angle, and emerges from the substrate 702 at an angle α2>α1. Therefore, even without considering isotropic dispersion from a bulk diffuser, the internally reflected light emerges from the dispersing layer 700 over a range of angles, and the off-center gain peak may be reduced. Isotropic dispersion from, for example, dispersing beads disposed within the high refractive index layer 706, may be used to disperse the emerging light further. Since the curved surfaces 710 disperse the emerging light over a range of angles, the degree of dispersion required of the diffuser to smooth out the off-center peak and remove the dip is reduced. Therefore, there is less need to compromise on the value of the vertical viewing angle.

Figure 8A:
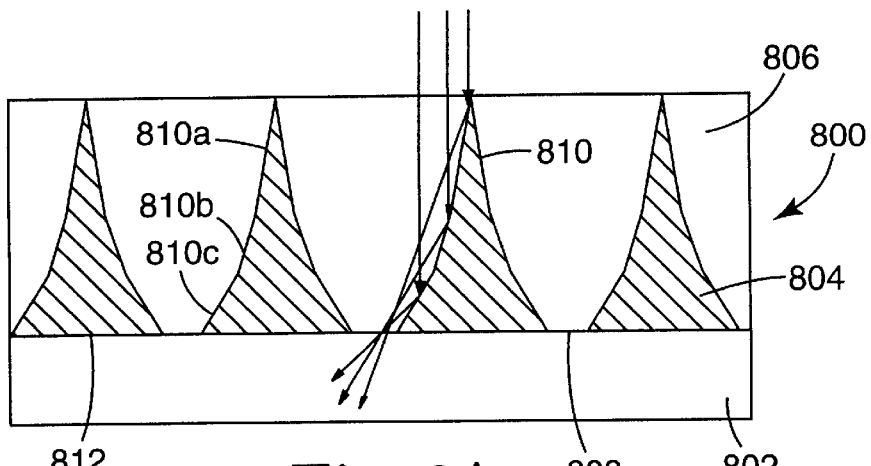
FIGS. 8A and 8B illustrate an embodiment of a light dispersing layer having faceted reflecting structures according to an embodiment of the present invention.

Another particular embodiment is illustrated in FIG. 8A. Here, the dispersing layer 800 is formed from light absorbing, internally reflecting structures 804 positioned on a surface of a substrate 802. The valleys between adjacent structures 804 are filled with a high refractive index material 806, and clear areas 808 lie between the bases 812 of the structures 804. The internally reflecting surface 810 of the structure 804 includes two or more rectilinear portions, or facets, lying at different angles to each other. In the particular example illustrated, the surface 810 is formed from three rectilinear portions 810a, 810b and 810c. The angle of incidence of light on the rectilinear portions 810a, 810b, 810c increases for the portions increasingly closer to the structure base. Accordingly, the internally reflected light emerges from the substrate 802 over a range of angles, even without any bulk diffusion or other isotropic dispersion. Therefore, a structure having a surface 810 with rectilinear portions may be formed to spread the light horizontally over a range of angles, and thus reduce the effect of both the dip and the off-center peak on the horizontal gain profile. Accordingly, the requirement to provide isotropic dispersion is reduced in this embodiment and, therefore, there is less need to compromise on the value of the vertical viewing angle.

In this particular embodiment and the like, the angle of each facet can be chosen so that the undeflected and internally reflected light emerges from the high refractive index material at equally spaced or progressively increasing angles. Furthermore, the length of each facet may be selected so that the amount of light emerging at the different angles is equal, is progressively smaller for increasing emerging angles, or has some other selected characteristic. This embodiment permits the gain profile to substantially eliminate dips and off-center peaks when an appropriate diffuser is provided between the bases 812, or throughout the high index material 806.

Figure 8B:
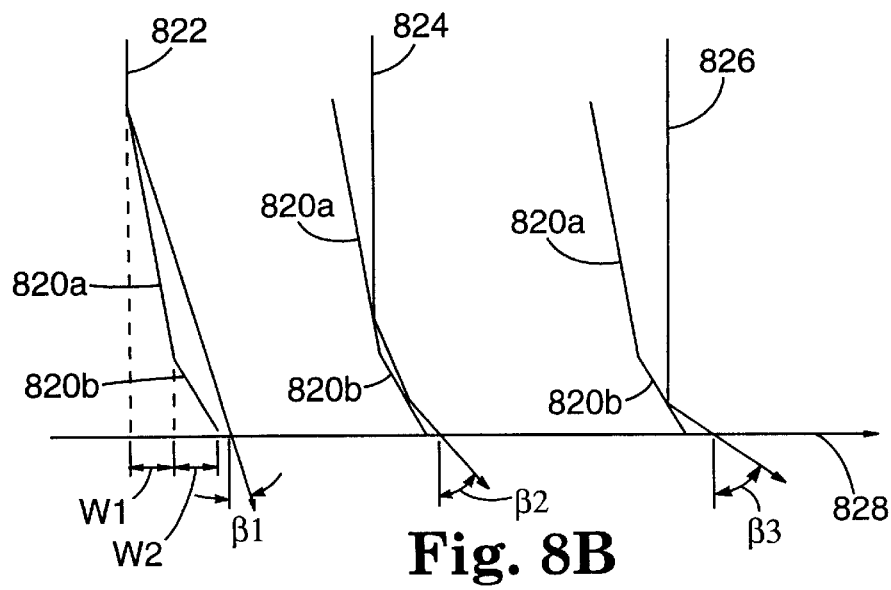

This is further illustrated in FIG. 8B which shows, in schematic form, the reflecting surfaces 820a and 820b formed by a structure 810 having two facets. The figure shows the paths taken by three rays of light 822, 824 and 826 incident at different points on the reflecting surfaces 820a and 820b. The horizontal extent of each of the reflecting surfaces 820a and 820b is respectively w1 and w2. The values of w1 and w2 may be equal, or may be set to be different, so that each reflecting surface 820a and 820b intercepts a different amount of the incident light.

The first ray 822 is incident on the top edge of the upper reflecting surface 820a, and passes through the lower surface 828 of the high index material 806 at an angle β1. The second ray 824 is incident close to the bottom edge of the upper reflecting surface 820a, and reflects off the upper reflecting surface 820a onto the lower reflecting surface 820b, and off the lower reflecting surface 820b through the lower surface 828 of the high index material 806 where it emerges with an angle β2 which is greater than β1. The third ray 826 is directly incident on the lower reflecting surface 820b, off which it reflects to emerge through the lower surface 828 of the high index material 806 at an angle β3 which is greater than β3.

Light may, of course, pass through the screen 800 undeflected. Therefore, a film with structures having only two facets may, without considering the effects of a diffuser or scatterer, produce light that emerges in four different directions. A diffuser or scatterer may be used to spread the light at each of these directions so as to reduce the off-axis peaks and to remove the gain dips.

An important advantage provided by the embodiments shown in FIGS. 7A and 8A is that light is effectively focused by the structures, so that the width of the clear space between adjacent structures may be reduced. Thus the clear area on the screen is reduced while the black area on the screen is increased, and so the overall screen contrast may be increased without a reduction in overall transmission or viewing angle.

The slope of the structures need not be highest at the top of the structure and lowest close to the structure base. Instead, the slope of the structure, i.e. the angle of its surface relative to the substrate, or the structure base, may be less for the structure surface closer to the top of the structure, and may be higher for the surface closer to the structure base.

Figure 9:
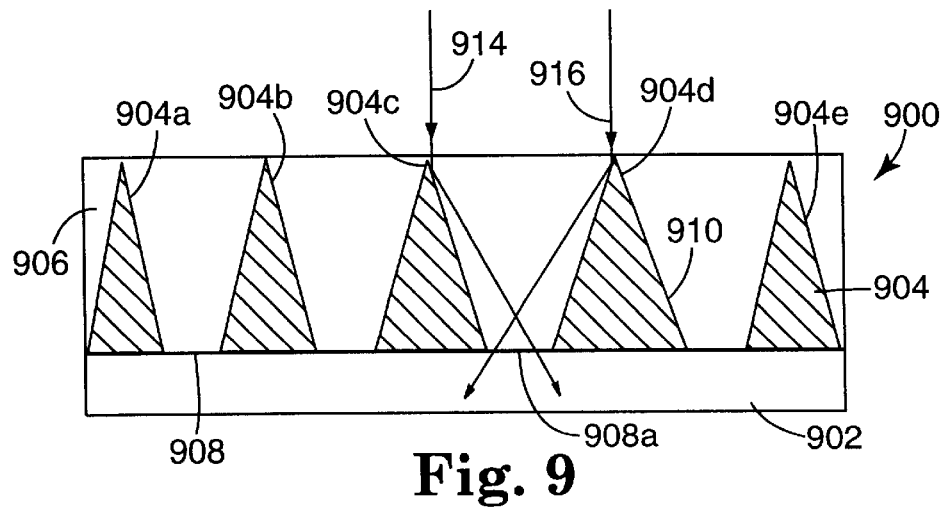
FIGS. 9 and 10 illustrate different embodiments of light dispersing layers according to the present invention.

Another particular embodiment is illustrated in FIG. 9, in which a number of light absorbing, internally reflecting structures 904 are provided on a substrate 902. The valleys between adjacent structures 904 are filled with a high refractive index material 906, and clear areas 908 lie between the bases 912 of the structures 904. The structures may have flat reflecting surfaces 910, although the surfaces 910 may also be curved or contain rectilinear portions. Different apex angles are used for different structures. For example, the apex angles of the structures 904a, 904b, 904c and 904d are all different. The position of the off-center gain peak and the gain dip are dependent on the apex angle of the internally reflecting structure. Accordingly, since the dispersing layer 900 has structures 904 having different apex angles, the internally reflected light emerges from the substrate 902 over a range of directions, if isotropic dispersion is ignored. Thus, the deleterious effects of the off-center gain peak and dip may be reduced and the requirement to provide isotropic dispersion is reduced in this embodiment. Therefore, there is less need to compromise on the value of the vertical viewing angle.

Unlike the embodiments illustrated in FIGS. 7A and 8A, the reflecting surface of each structure 908 presents only one angle to incident light, and so the light emerges from that structure only at one angle. However, the structures 908 may be made to be sufficiently small that a viewer's eye perceives light from a single pixel that has a dimension sufficiently large to cover several structures having different apex angles. thus, the integrated effect is that light emerges from each pixel over a range of angles.

An increased apex angle results in the light reflected at the top of the structure 904 being displaced by a greater distance from the structure base as the light passes through the interface between the high index layer 906 and the substrate 902. Accordingly, the width, d, of the clear space 908 between a pair of adjacent structures 904 is preferably selected to permit the light reflected from the top of the structure 908 to pass through without a second reflection. Thus, the separation between structures 904c and 904d is selected to permit rays 914 and 916 to pass through the clear area 908a therebetween. Second internal reflections may be problematic because the angle of incidence on the reflecting surface 910 is greater than the first reflection, and so the second bounce onto a reflecting surface may be at an angle smaller than the critical angle, resulting in absorption losses. Furthermore, a second internal reflection increases the path length within the high index material layer 906 which may result in further losses if the layer 906 is loaded with diffusing particles.

On the other hand, since the contrast of the screen is dependent on the fractional area of the absorbing bases on the screen's viewing surface, the contrast of the screen may be increased if the structures are placed closer together. Accordingly, the pitch between adjacent structures may be varied in accordance with the aspect ratio of the structures. For those structures having an aspect ratio which results in the light intercepting the clear area close to the structure base, for example structures having a smaller apex angle, then the inter-structure spacing may be reduced. Also, where the structure aspect ratio results in the light intercepting the clear area further from the structure base, for example structures having a larger apex angle, then the inter-structure spacing may be increased.

The inter-structure spacing, or pitch, may be selected to be constant, or may vary between different structures. For example, the inter-structure spacing for different structures may be randomized. A film having a randomized inter-structure spacing may have structure apex angles selected according to the randomized spacing to optimize light transmission through the film.

This embodiment may be useful for reducing Moiré patterns, since the pattern of structures 904 has no fixed period. A Moiré pattern is an interference pattern that is generated as result of sampling frequency (the screen pitch) being less than twice the frequency of the pattern being displayed (for example the pitch of the imager which is related to the pixel size). Another mechanism for generating Moiré patterns is when the sampling frequency (screen pitch) and the image frequencies are very close to each other and as a result they beat against each other. One way to eliminate a Moiré pattern, or at least make it less viewable, is to reduce the pitch of the screen so that the screen frequency is much more than the pixel frequency. Therefore, the Moiré pattern may be reduced where the period of the structure spacing is selected to be less than the size of the pixel. Also, the Moiré pattern may be reduced where the spacing between different structures is different, for example randomized.

Figure 10:
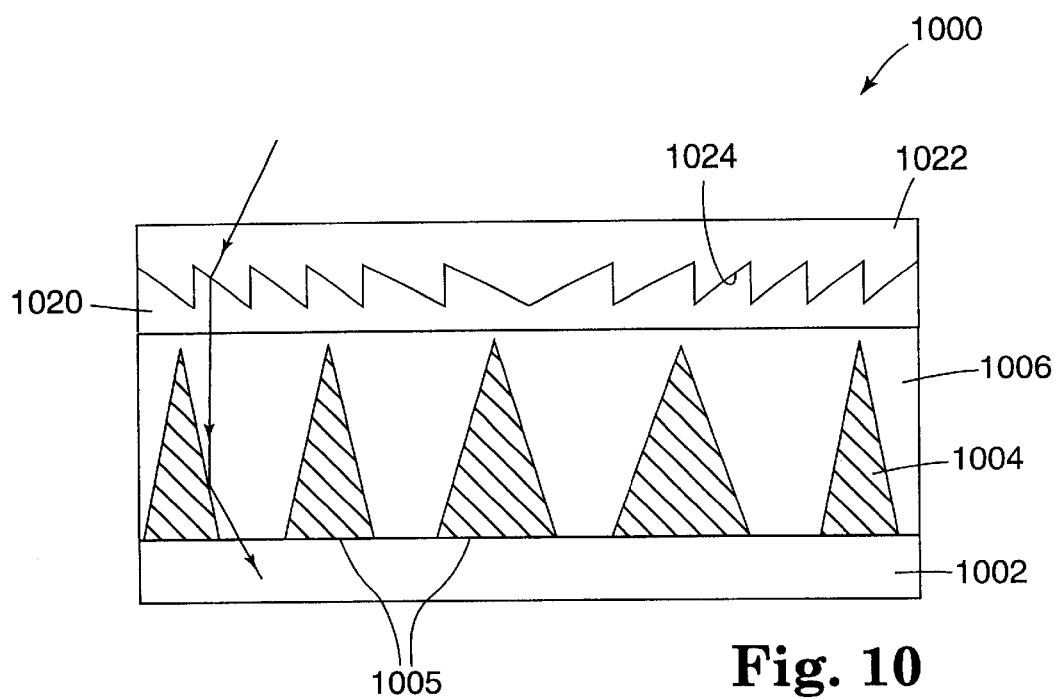

Another embodiment is illustrated in FIG. 10. The dispersing layer 1000 includes internally reflecting structures 1004 positioned on a surface of a substrate 1002. The structures 1004 are formed from a material having a relatively low refractive index, and a layer 1006 of relatively high refractive index fills the valleys between the structures 1004. The base portion 1005 of each structure 1004 contains light absorbing material to enhance the contrast provided by the dispersing layer 1000. The remainder of each structure 1004 need not contain light absorbing material.

The light dispersing layer 1000 may also be provided with a Fresnel lens to collimate light from the image light source so as to be parallel to an axis between the image light source and the screen, or at least to partially redirect the light propagating between the image light source and the light dispersing layer. A first surface Fresnel lens may be used, but this approach suffers from the problems described earlier.

Another approach, using an embedded Fresnel lens is illustrated in FIG. 10. Embedded Fresnel lenses are discussed more fully in U.S. patent application Ser. No. 09/229, 198, filed on Jan. 13, 1999 and which is incorporated herein by reference. An embedded Fresnel lens is formed from a material having a relative high refractive index, and is embedded in a material of relatively low refractive index to permit refraction at the output surface of the Fresnel lens to substantially collimate or redirect the light. Therefore, this embodiment includes a layer 1020 of a material having a relatively low refractive index disposed above the high refractive index layer 1006. A Fresnel lens 1022 is disposed above the low index material layer 1020, with the surface 1024 of the Fresnel lens embedded in the low index material layer 1020.

Figure 21A:
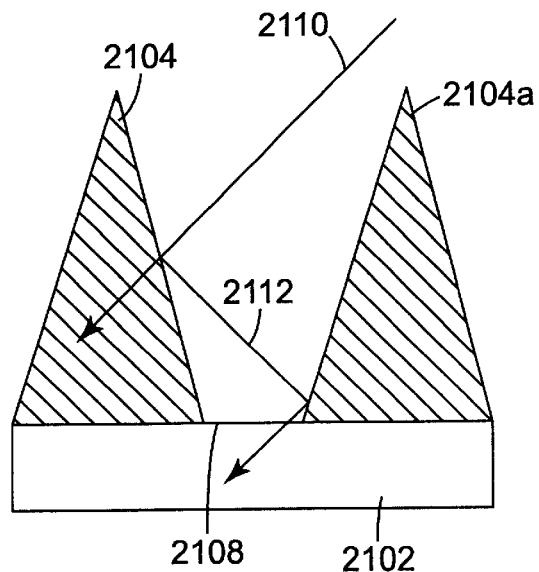
FIG. 21A illustrates the absorption of stray light by reflecting structures.

A Fresnel lens having a second surface in air may be used with the present invention. Such Fresnel lenses typically suffer from a problem of ghost images that arise from off-axis reflections of light, as is described U.S. patent application Ser. No. 09/229,198. One particular advantage provided by the present invention is that the off-axis ghost image light may be incident on the structures at an angle below the critical angle, in which case the ghost image is absorbed, as illustrated in FIG. 21A. Stray light 2110 is incident on a structure 2104 at an angle less than the critical angle, and so a portion of the light passes into the structure 2104 where it is absorbed. The structure 2104 is drawn shaded in order to show passage of the light into the structure 2104. A portion of the light 2110 may be reflected as ray 2122, and be further incident on another structure 2104a, where another portion is absorbed. Thus, the structures may be used to absorb stray light entering the input side of the screen.

Figure 21B:
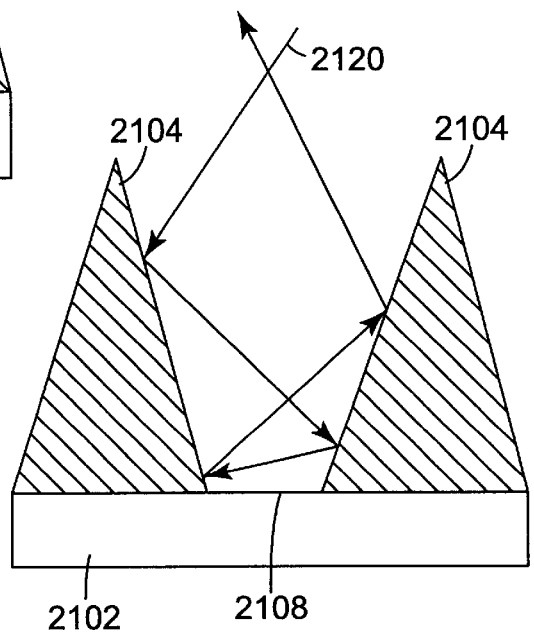
FIG. 21B illustrates the redirection of stray light by reflecting structures.

Another advantage is that the ghost image may be reflected back out of the screen through the input face, so that the ghost image never passes out to the viewer. This is illustrated in FIG. 21B, which shows stray light 2120 reflecting multiple times between two structures 2104, and being directed away from the viewer's side of the screen so that it does not pass out through the clear space 2108 between the structures 2104. Thus, the structures may also be used to redirect stray light that enters the input side of the screen.

Therefore, the present invention may be used to remove the ghost image that results from the use of a Fresnel lens, and may also be useful at reducing the amount of stray light that passes from the input side of a screen to the viewer's side of the screen.

It should be appreciated that Fresnel lenses, including first surface, and second surface Fresnel lenses, both embedded Fresnel lenses and Fresnel lenses with the second surface in air, may be used with the other embodiments described herein.

Figure 11:
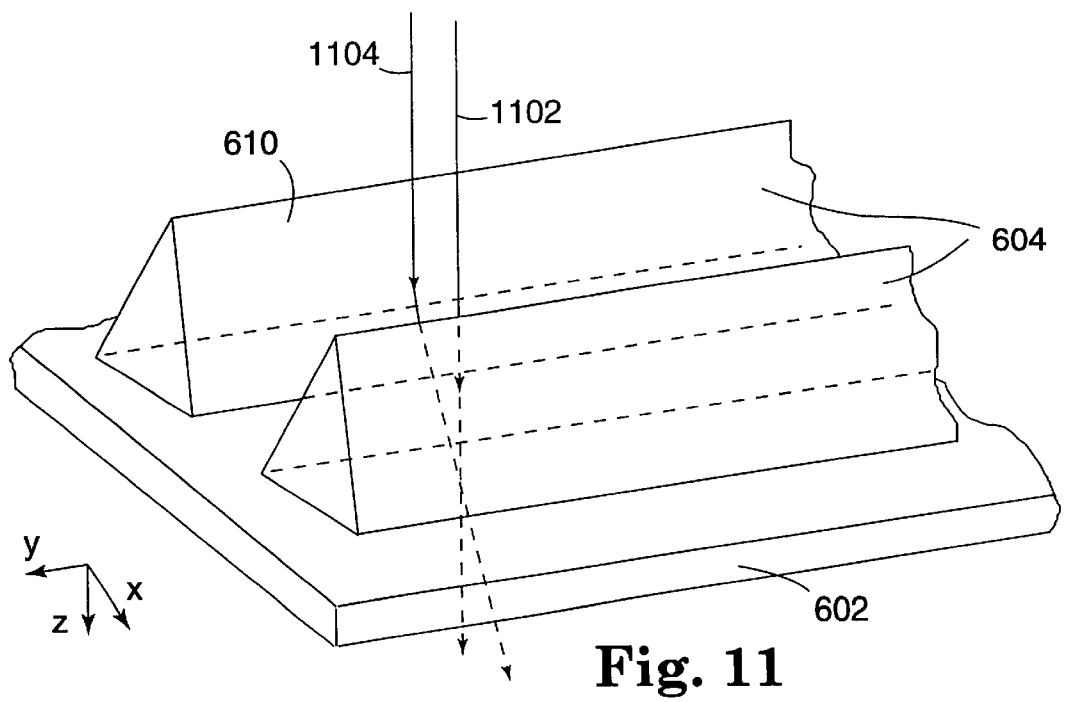
FIG. 11 illustrates, in perspective view, another embodiment of a light dispersing layer according to the present invention.

The reflecting, light absorbing structures may be arranged in different geometrical patterns, and may also be shaped to disperse light in more than one direction. Consider first the arrangement illustrated in FIG. 11, which is a perspective view of the embodiment illustrated in FIG. 6A, without the layer of high index material for clarity. The structures 604 are arranged in parallel, forming a rib-like arrangement, and are shaped for dispersing light in the x-direction only. For example, light ray 1102 passes through the substrate without being deviated , while ray 1104 reflects off the surface 610 and propagates within the x-z plane with a direction component parallel to the x-axis.

The structures 604 need not be straight, and could be curved to direct light into desired directions.

Figure 12:
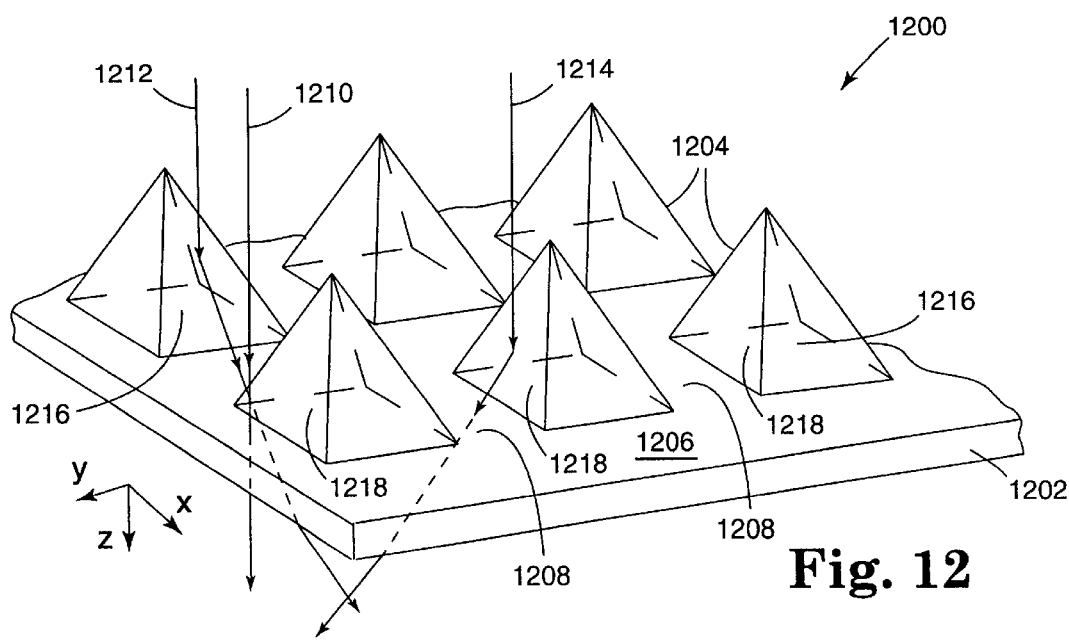
FIGS. 12 and 14 illustrate additional embodiments of light dispersing layers of the present invention, with light dispersion in two dimensions.

Another embodiment is illustrated in FIG. 12, where a substrate 1202 has structures 1204 positioned on one surface 1206. A layer of high refractive index material may be disposed over the structures 1204 and the substrate, but this is not shown in order to simplify the illustration. There are clear areas 1208 between the structures 1204, where the light reflected by the structures 1204 passes into the substrate 1202. The structures 1204 are shaped to disperse light in two directions, namely within the x-z plane and within the y-z plane, i.e. so that the light travels with an x-direction component and a y-direction component respectively. Light ray 1210 is directly incident on a clear area 1208 and passes into the substrate without reflection. Light ray 1212 reflects off one of the faces 1216 facing the x-direction, and emerges from the substrate 1202 travelling in the x-z plane, with a direction component parallel to the x-axis. Light ray 1214 reflects of one of the faces 1218 facing the y-direction, and emerges from the substrate 1202 travelling in the y-z plane, with a direction component parallel to the y-axis. Therefore, the structures may be shaped to have reflecting faces oriented to reflect light along both the x- and y-directions.

Figure 13A:
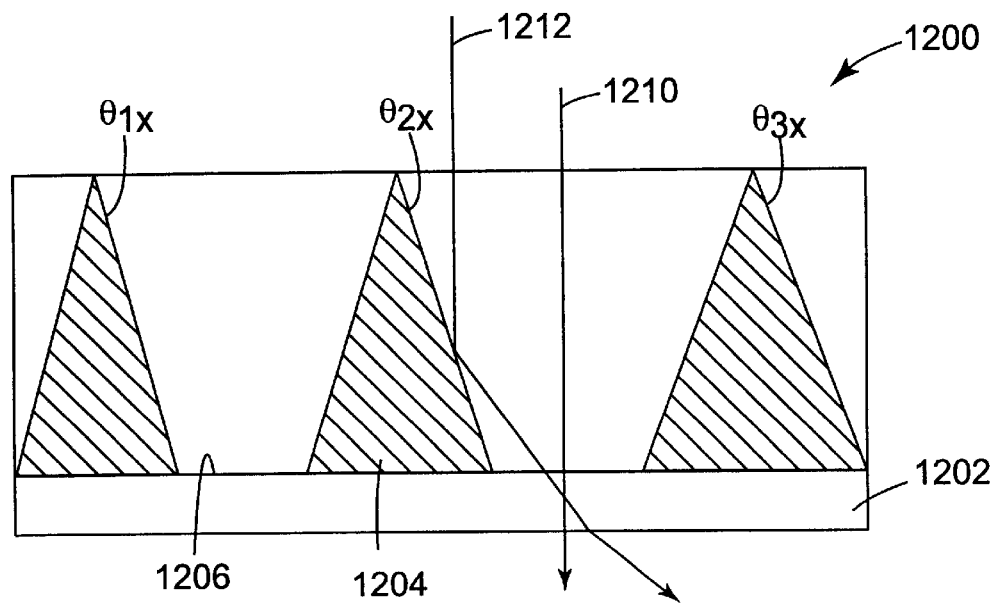
FIGS. 13A and 13B illustrate schematic cross-sections through the light dispersing layer of FIG. 12.
Figure 13B:
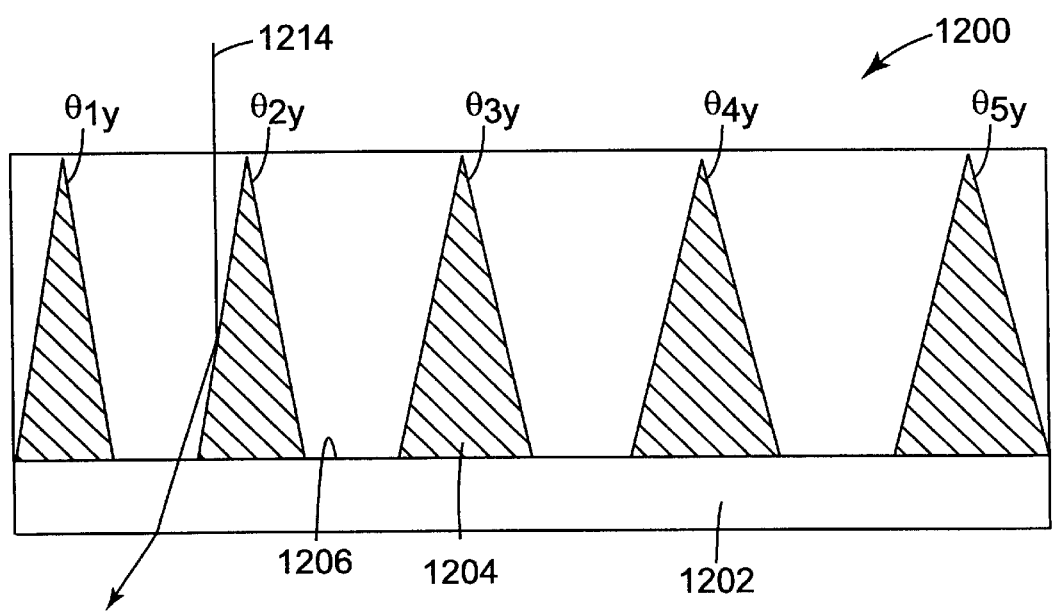

The angle of the faces in one direction may be different from the angle of the faces in the other direction, to provide different amounts of dispersion in the x- and y-directions. For example, the structures 1104 may be pyramidal in shape, and have different sets of angles for dispersing in the x and y directions. This is illustrated in FIGS. 13A and 13B. FIG. 13A illustrates a cross-section through the dispersing layer 1200 parallel to the x-axis. The three structures 1204 may be provided with three different apex angles $\theta_{1x}$, $\theta_{2x}$, and $\theta_{3x}$, in a manner similar to that described above with regard to FIG. 9 to reduce the effects of the off-center peak and the gain dip. Likewise, the structures may be provided with different apex angles for dispersing the light in the y-direction. FIG. 13B illustrates a cross-section through the dispersing layer 1200 parallel to the y-axis. The structures 1204 may be provided with different apex angles $\theta_{1y}$, $\theta_{2y}$, $\theta_{3y}$, $\theta_{4y}$, and $\theta_{5y}$ for reducing the effects of the off-center peak and the gain dip. It will, of course, be appreciated, that the structures 1204 may also be provided with curved reflecting surfaces, or with reflecting surfaces having rectilinear portions, for reducing the effects of the off-center peak and the gain dip.

The structures 1204 in FIG. 12 are positioned so as to provide a clear area 1208 that has a "checkered" pattern, of stripes in the x- and y-directions. The positions of the structures may be different, resulting in a different pattern of clear area. For example, in FIG. 14, the structures 1404 are arranged on the substrate 1402 so that the corners of their bases touch. This results in a pattern of clear areas 1408 that resembles a checkerboard, and may provide an advantage of increasing the contrast of the screen without reducing the net throughput of light from the image light source. It should be appreciated that other spatial arrangements of structures may be used.

Figure 14:
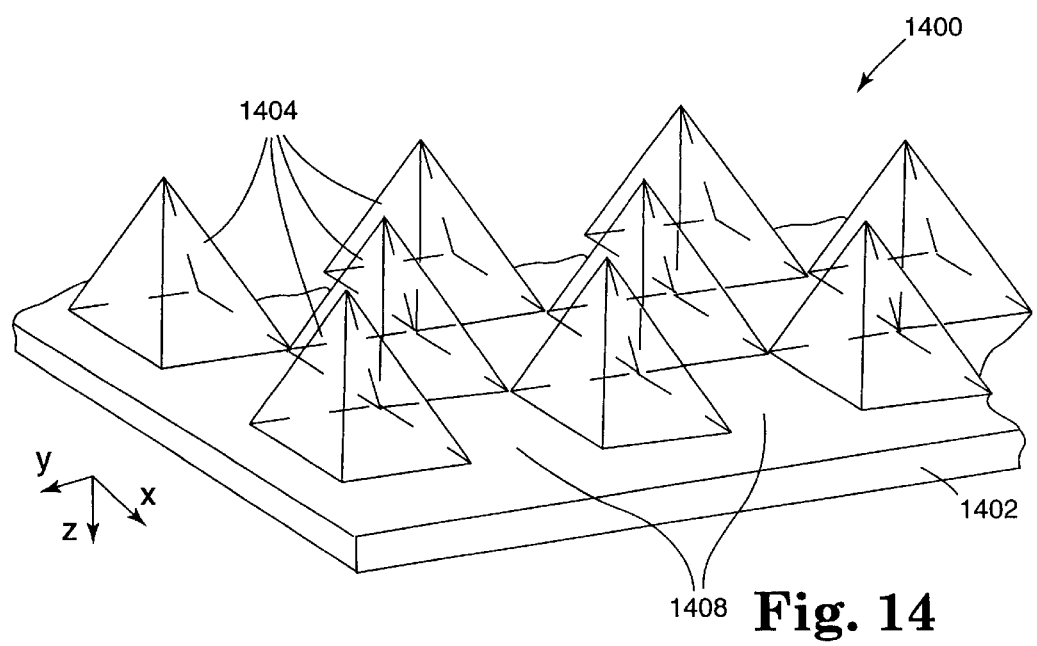

It will be appreciated that two dimensional structures, having shapes other than those shown in FIGS. 12 and 14 may be employed. For example, the structures may be formed to have rectangular bases, or bases having some other four sided shape useful Additionally, the structures may be formed having bases with other numbers of sides, including three, five, six, and so on.

Figure 15:
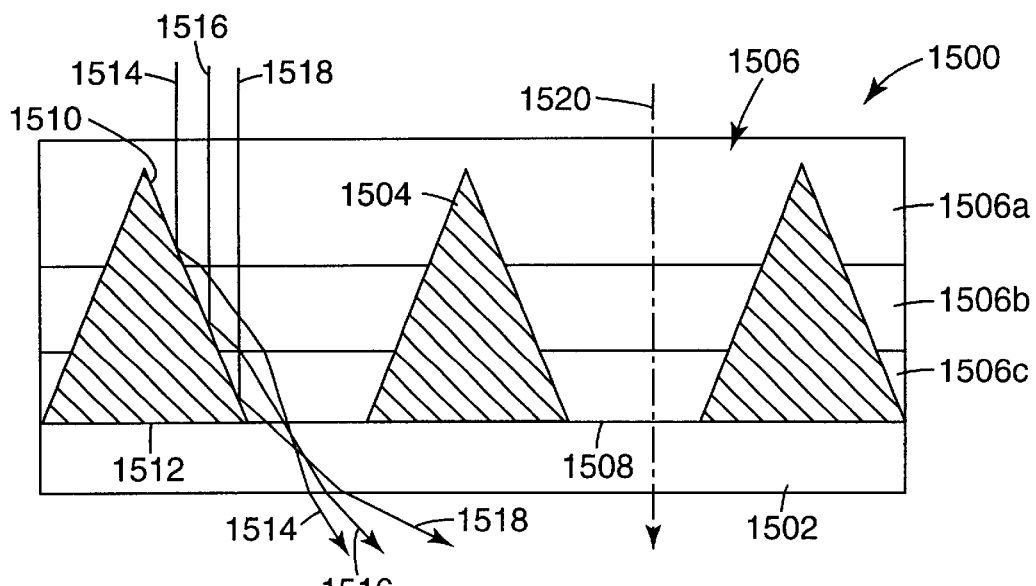
FIG. 15 illustrates an embodiment of a light dispersing layer having an overcoat with a varied refractive index according to an embodiment of the invention.

Another embodiment of a light dispersing layer is illustrated in FIG. 15. The dispersing layer 1500 is formed from light absorbing, internally reflecting structures 1504 positioned on a surface of a substrate 1502. The valleys between adjacent structures 1504 are filled with a high refractive index material 1506, and clear areas 1508 lie between the bases 1512 of the structures 1504. The internally reflecting surface 1510 of the structure 1504 may be straight. The coating of high refractive index material 1506 includes layers 1506a, 1506b and 1506c of increasing refractive index, which serve to spread the reflected light out over more than one direction and to focus the light, thus permitting the size of the clear area between adjacent structures 1504 to be reduced, thus increasing the screen contrast.

The first light ray 1514 is reflected from the reflecting surface 1510 within the first high index layer 1506a. The ray 1514 is refracted towards a direction parallel to the screen axis 1520 on passing into the second high index layer 1506b which has a higher refractive index than the first high index layer 1506a. The first light ray 1514 is further refracted towards the screen axis 1520 on passing into the third high index layer 1506c before passing into the substrate 1502.

The second light ray 1516 is reflected from the reflecting surface 1510 within the second high index layer 1506b. The ray 1516 is refracted towards a direction parallel to the screen axis 1520 on passing into the third high index layer 1506c which has a higher refractive index than the second high index layer 1506b. The second ray 1516 then passes into the substrate 1502.

The third light ray 1518 is reflected from the reflecting surface 1510 within the third high index payer 1506c and undergoes no further refraction within the high index layer 1506 before entering the substrate 1502. The third light ray 1518 emerges from the substrate 1502 at a higher angle than the second light ray 1516 since the third light ray was not refracted within the high index layer 1506. Also, the second light ray 1516 emerges from the substrate at a higher angle than the first light ray 1514, since it undergoes fewer refractions than the first ray 1514.

Thus, a layered high index material 1506 may be used to spread the light reflected from a structure 1504 having straight reflecting surfaces, thus reducing the off-axis gain peak and gain dip. The layered high index material may, of course, also be used with reflecting structures having faceted, or curved reflecting surfaces. Furthermore, since the effect of the layered high index material 1506 is to direct light towards the screen axis 1520, the spacing between structure bases 1512 may be reduced, with a concomitant increase in screen contrast.

A layered high index material may be used where the refractive index decreases from top to bottom, rather than increasing from top to bottom. Such a layered high index layer will also have the effect of increasing the angular range of light reflected from a flat reflecting surface. However, such a layer will tend to defocus light, rather than focus the light as it propagated though the layer, and so the reflecting structures may need to be spread further apart to avoid second reflections from adjacent structures, and so the contrast may be reduced.

It should be appreciated that a high index material having a refractive index that is graded from top to bottom operates in a manner similar to the layered high refractive index material. Thus, the layered high index material of the film 1500 may be replaced by a graded high index layer.

Figure 16:
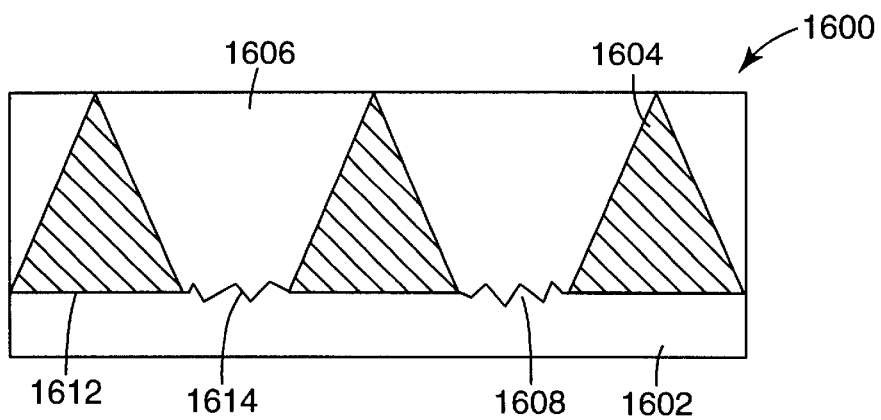
FIG. 16 illustrates an embodiment of a light dispersing layer having a scattering interface according to an embodiment of the invention.

Since the present invention is particularly useful for reducing the interdependence of the horizontal and vertical viewing angles, a surface scatterer may be used for dispersing light in the vertical dispersion plane. One example is shown in FIG. 16, which illustrates a film 1600 having a substrate with structures 1604 on an upper substrate surface, separated by clear areas 1608. An overcoat 1606 of high refractive index material covers the structures 1604 and the clear areas 1608. The interface 1614 between the overcoat 1606 and the substrate 1602, at the clear areas 1608 between the structure bases 1612, may be structured to optically scatter the light passing through the clear areas 1608, where there is a refractive index difference between the overcoat 1606 and the substrate. For example, the interface 1614 may be have a random matte surface that scatters light isotropically, or may have a surface that scatters light asymmetrically, such as a microstructured or microholographic interface. One example of a method of forming a surface scatterer is to form a scattering surface on the substrate 1602 prior to formation of the structures 1604. If the structures 1604 are then formed on the substrate 1602 to have a refractive index that closely matches that of the substrate, then index matching will effectively remove the scatterer at the bases of the structures 1604, leaving surface scatterer only at the clear areas 1608 between the structure bases. An advantage of this approach is that ambient light entering the substrate from the viewer's side is not scattered before entering the absorbing bases 1612.

Figure 17:
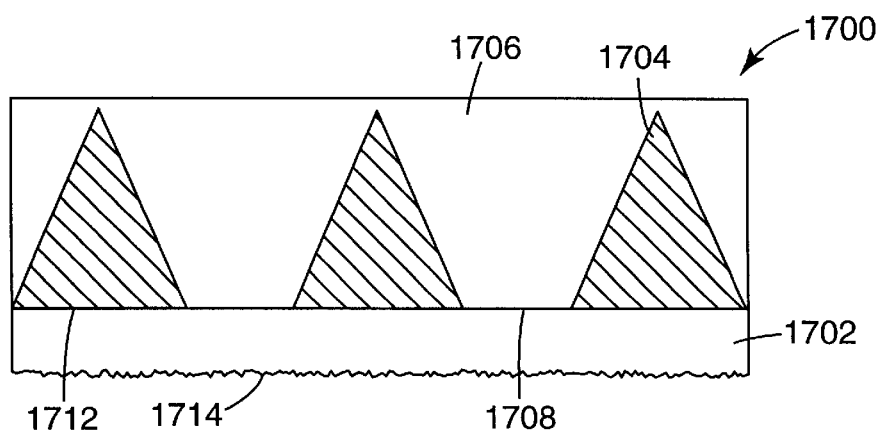
FIG. 17 illustrates an embodiment of a light dispersing layer having a scattering surface according to an embodiment of the invention.

Another example of using a surface scatterer is illustrated in FIG. 17, which shows a film 1700 with low refractive index structures 1704 on a substrate 1702, with an overcoat 1706 of high index material covering the structures 1704 and the clear areas 1708 between the structure bases 1712. The lower surface 1714 of the substrate 1702 may be structured to optically scatter the light that emerges from the substrate 1702. For example, the lower surface 1714 may be have a random matte surface that scatters light isotropically, or may have a surface that scatters light asymmetrically, such as a microstructured or microholographic surface.

Figure 22:
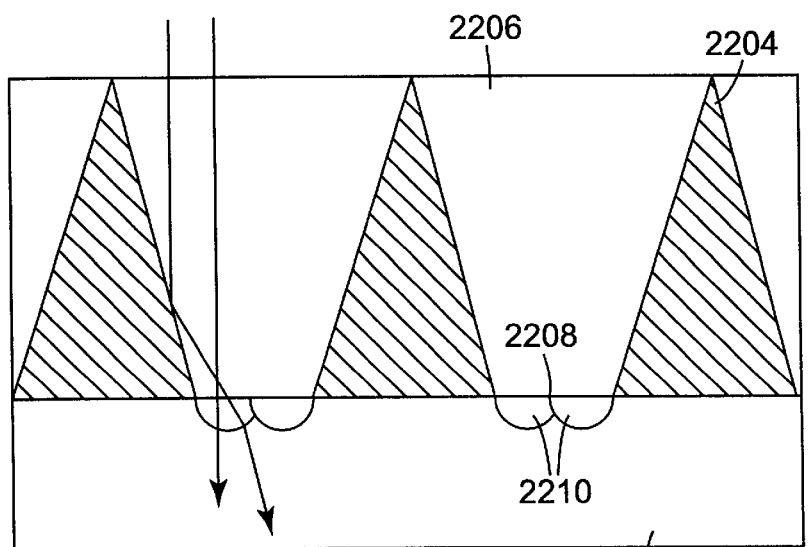
FIG. 22 illustrates an embodiment of a light dispersing layer having a refracting structures positioned to refract light passing through open areas, according to an embodiment of the invention.

One particular example of a microstructured surface being used at the open areas is illustrated in FIG. 22. Here, structures 2204 of light absorbing, low refractive index material are disposed over a substrate 2202. A coating of relatively high refractive index 2206 overlies the structures 2204 and the open areas 2208 between the structures 2204. Refractive structures 2210 are disposed in the upper portion of the substrate 2202, at the open areas 2208, to refract the light passing through the open areas. The refractive structures 2210 may be, for example, lenticular lenses embedded in the substrate. The refractive structures 2210 may also be shaped as lenslets that diverge light in more than one dispersion plane. A lenslet refractive structure 2210 may be used, for example, to disperse light in a horizontal dispersion plane, in the same direction as the reflective dispersion resulting from the structures 2204, as well as to disperse light in a vertical dispersion plane.

Figure 18:
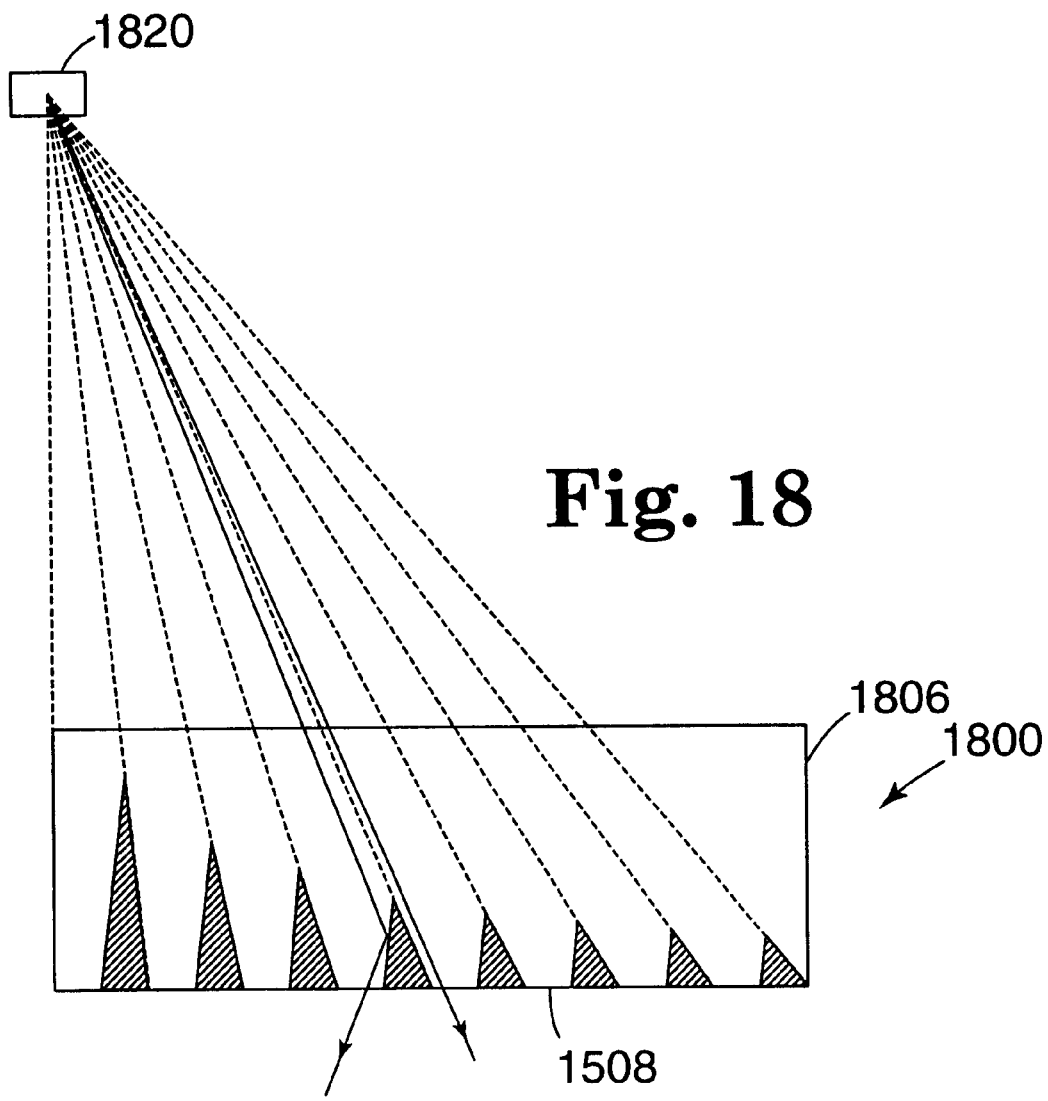
FIG. 18 illustrates another embodiment of a light dispersing layer according to the present invention.

Another embodiment of a light dispersing layer 1800 is illustrated in FIG. 18, in which the shape of the internally reflecting structures changes as a function of distance from the center of the screen. Here, a source 1820 directs image light towards a light dispersing layer 1800 having number of structures 1804 of low refractive index material embedded within a layer 1806 of high refractive index material. The structures 1804 may also include light absorbing material to provide contrast to the screen.

The structures 1804 may be shaped to reduce the divergence of light emerging from the screen. The structures 1804 may be formed as ribs, as off-set pyramids, or may also be formed in a radially symmetrical design, as rings around the center of the screen.

Figure 19:
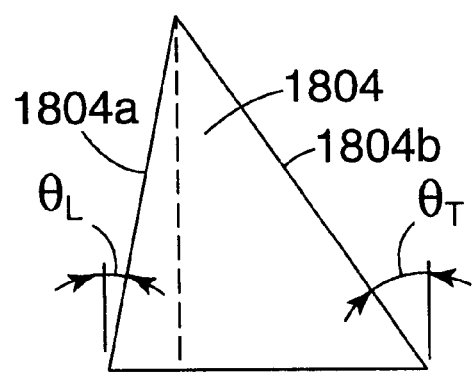
FIG. 19 illustrates an expanded view of a low-refractive index structure of the embodiment shown in FIG. 16.

The difference in refractive index between the structures 1804 and the high index layer 1806 is selected so that light incident on the structures 1804 undergoes total internal reflection, and is consequently directed through the open spaces 1808 between the structures 1804. In one embodiment, described with reference to FIG. 19, the structures are set with the leading edge 1804a at and angle, $\theta_L$, of 5°. The trailing edge 1804b may be set to be parallel to the ray just clearing the top of the structure 1804 on the way through the high index layer 1806. At this angle, no light is internally reflected in a direction away from the center of the screen, and so the overall divergence of light from the screen is reduced.

The spacing between structures 1804 is preferably smaller than a screen pixel size in order to maintain high screen resolution. Minimizing the total area of the open space 1808 increases screen contrast, because more light absorbing area is presented to the viewing side of the screen. However, if the structures 1804 are set too closely together, then light reflected off the leading edge 1804a of one structure 1804 may be reflected into the trailing edge 1804b of the adjacent structure 1804, resulting in a loss of light. Accordingly, there is a trade-off between screen transmission and screen contrast.

Figure 20A:
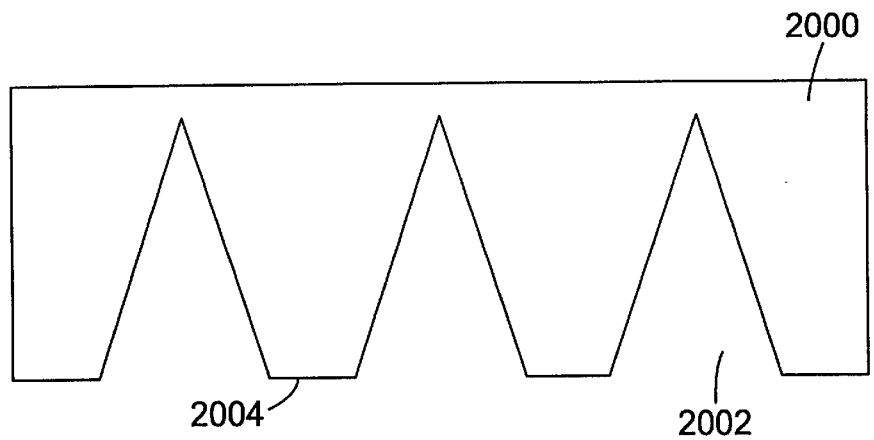
FIGS. 20A–20C illustrate manufacturing steps in a method for manufacturing a film according to the present invention.

Another method of manufacturing a film of the present invention is described with reference to FIGS. 20A–20C. First, a grooved film 2000, as illustrated in FIG. 20A, is formed from a material having a relative high refractive index. The film 2000 may be formed using a cast and cure process. Curing may be thermal or optical. The grooves 2002 on the lower side of the film 2000 are separated by flat surfaces 2004, also known as land.

Figure 20B:
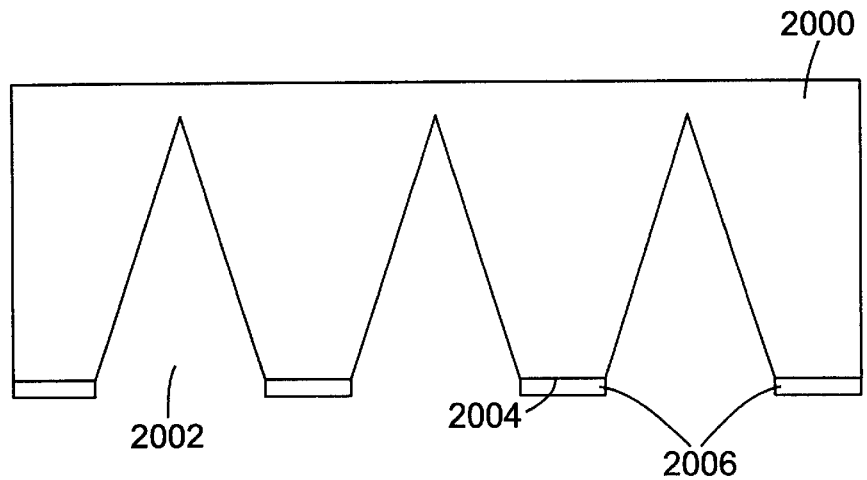

The flat surfaces 2002 are coated with a layer of diffuser 2006, which may be a bulk diffuser similar to that described above, to produce the unfinished article illustrated in FIG. 20B. The diffuser 2006 may be coated onto the flat surfaces 2002 using a printing process, for example lithographic or letter press or off-set printing.

Figure 20C:
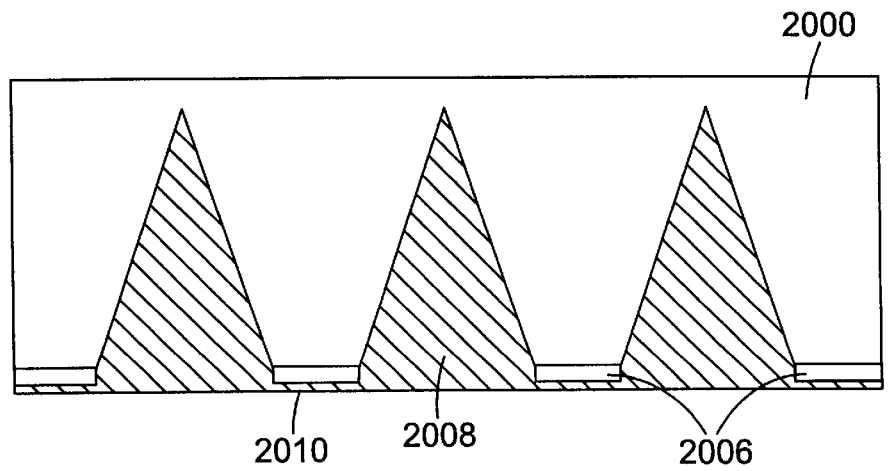

Once the diffuser 2006 has been applied, the grooves 2002 are filled, typically in a planarization process, with a material of a relatively low refractive index to form low index structures 2008, as shown in FIG. 20C. A thin layer 2010 of the low index material, loaded with absorbing material, may be left at the flat surfaces 2004 to create a thin land of low index material.

A method for manufacturing another embodiment of a reflectively dispersing screen film is illustrated in FIG. 23. The first step is to form a number of structures 2304 on a substrate 2302, for example using a cast and cure process as described above, to produce the film shown at Step 1. Next, an overcoating of a removable material is laid over the structures 2304 and the substrate 2302. The removable material may be a polymer, such as a photoresist or another polymer that is removable in a controlled manner, for example using a wet etchback, laser ablation, or a dry etch. Examples of additional etchback processes for removing a polymer are discussed in U.S. patent application Ser. No. 08/999,287, which is incorporated herein reference. The removable material may then be removed in a controlled manner to leave only portions 2310 at the bottom of the valleys between adjacent structures 2304, covering the clear areas 2308, as shown at Step 2&3.

A metal coating 2312 may then be disposed over the film 2300, for example by vacuum coating. The metal may be aluminum, or any other metal with suitable reflection characteristics for the particular application. The resulting film is shown at Step 4.

The remaining removable material 2310 may then be removed, for example in a lift-off process. For example, if the removable material is a photoresist, then the remaining photoresist portions may be removed in a sodium hydroxide bath or spray. For other types of removable material, the remaining portions 2310 may be removed using a suitable solvent. An overcoat layer 2334 may then be disposed over the metalized structures 2304 and the open areas 2308, for example using a planarization process. The resulting film 2330 is illustrated at Step 5, with metalized portions 2332 coated on the structures 2304.

Metalized coatings, such as illustrated in FIG. 23, may be used with any of the other embodiments discussed above, where applicable, and also with different combinations of embodiments.

While various examples were provided above, the present invention is not limited to the specifics of the illustrated embodiments. For example, while many embodiments were described with a substrate layer, the internally reflecting structures may be embedded within the high refractive index layer, without a substrate layer. On the other hand, the internally reflecting, light dispersing layer may be but one of a number of layers used in a rear projection screen. Furthermore, it will be appreciated that light may undergo more than one internal reflection on passing through the film, for example light may be reflected off a first structure to a second structure, and may reflect off the second structure before passing through the clear area between structures. Where the refractive index difference between the structures and the high index layer is sufficiently high, the second reflection may be a total internal reflection. Furthermore, internal reflection may take place at the interface between the high index material and the structure at angles less than the critical angle, particularly where light has been diffusely scattered before reaching the interface. In such a case, a large fraction of the light may still be reflected, even though total internal reflection does not take place.

It will be appreciated that the structures present in a film need not all be formed to have the same height. It will also be appreciated that the outer surfaces of the light dispersing layer and/or the screen may be treated with additional coatings for protection against physical damage, such as hard coatings and anti-smudge coatings. In addition, anti-reflection coatings may be provided on the outer surfaces to reduce reflective losses.

It will further be appreciated that reflectively dispersing screen films may be formed that include various combinations of the approaches presented above. For example, an internally reflecting screen may be formed using faceted structures with different inter-structure spacings between different adjacent structure pairs. Also, a metalized coating may be formed on a structure having a curved reflecting surface.

As noted above, the present invention is applicable to display systems as a light dispersing film. It is believed to be particularly useful in back projection displays and screens. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A light dispersing film for a rear projection screen, comprising:
   a first layer formed from a first material having a first refractive index, the first layer having first and second opposing sides and an optical axis normal to the first side,
   the first layer including structures formed from a second material having a second refractive index smaller than the first refractive index, the structures having bases at the second side with one or more side walls extending towards the first side, first internal reflecting surfaces being formed by interfaces between the first and second materials, the structure bases including a light absorbing material, optically transmitting areas of the second side being defined between the structure bases,
   the first internally reflecting surfaces forming reflecting units that asymmetrically disperse light through respective optically transmitting areas, the first reflecting surfaces forming surfaces disposed at at least two angles relative to the optical axis.

2. A film as recited in claim 1, wherein at least a portion of one of the first internally reflecting surfaces is curved.

3. A film as recited in claim 2, wherein the curved portion of the one of the first internally reflecting surfaces is paraboloidal.

4. A film as recited in claim 1, wherein at least one of the first internally reflecting surfaces includes two or more rectilinear portions disposed at different angles relative to the optical axis.

5. A film as recited in claim 4, wherein the rectilinear portions are substantially non-parallel with the optical axis.

6. A film as recited in claim 1, wherein a first separation distance between a first pair of adjacent structures is different from a second separation distance between a second pair of adjacent structures.

7. A film as recited in claim 1, wherein an inclusion angle is defined for each of the structures, different structures having different inclusion angles.

8. A film as recited in claim 7, wherein the inclusion angles of the different structures are directed in a same direction away from the second side.

9. A film as recited in claim 1, wherein the first internally reflecting surfaces are arranged to reflect light propagating in a direction approximately parallel to the optical axis within the first layer, the reflected light propagating in directions substantially parallel to a first dispersion plane, and the structures have second internally reflecting surfaces oriented to reflect light, propagating in a direction approximately parallel to the optical axis within the first layer, in directions parallel to a second dispersion plane perpendicular to the first dispersion plane.

10. A film as recited in claim 1, wherein the second material is a light absorbing material.

11. A film as recited in claim 1, wherein the structures are formed in the first layer as parallel members extending over substantially an entire width of the first layer.

12. A film as recited in claim 1, wherein the first layer includes diffusing portions positioned proximate the optically transmitting areas of the second side.

13. A film as recited in claim 12, wherein the diffusing portions include a scattering surface on the second side to scatter light propagating through the optically transmitting areas.

14. A film as recited in claim 12, wherein the diffusing portions include a bulk diffusing portion extending from the second side at least part way into the first layer.

15. A film as recited in claim 1, wherein light diffusing particles are disposed throughout the first material.

16. A film as recited in claim 1, further comprising a substrate layer attached to the second side of the first layer.

17. A film as recited in claim 1, wherein the first internally reflecting surfaces are arranged to reflect light, propagating in a direction approximately parallel to the optical axis within the first layer, in directions substantially parallel to a first dispersion plane, and at least one of the surfaces of the substrate layer is structured to disperse light in at least a direction parallel to a second dispersion plane perpendicular to the first dispersion plane.

18. A film as recited in claim 1, further comprising a Fresnel lens disposed to reduce divergence of light entering the first side of the first layer.

19. A film as recited in claim 1, further comprising an image light source disposed to illuminate the first side of the first layer with image light.

20. A film as recited in claim 19, wherein different structures are arranged with structure apexes directed towards the image light source.

21. A film as recited in claim 1, wherein structures disposed close to the edge of the first layer are arranged with structure apexes directed away from the edge of the screen.

22. A film as recited in claim 1, wherein at least one reflecting unit includes reflecting surfaces disposed to reflect light, incident on one of the reflecting surfaces of the at least one reflecting unit in a direction substantially parallel to the first optical axis, more than once before the light passes through the optically transmitting area of the at least one reflecting unit.

23. A light dispersing film for a rear projection screen, comprising:
  a first layer formed from a first material having a first refractive index, the first layer having first and second opposing sides and a first optical axis normal to the first side,
  the first layer including structures formed from a second material having a second refractive index smaller than the first refractive index, the structures having bases at the second side with one or more side walls extending towards the first side to define first reflecting surfaces, the structure bases including a light absorbing material, optically transmitting areas of the second side being defined between the structure bases,
  the first reflecting surfaces forming reflecting units that asymmetrically disperse light through respective optically transmitting areas, and the first reflecting surfaces being disposed to reflect light to more than two selected directions within a dispersion plane.

24. A film as recited in claim 23, wherein at least a portion of one of the first reflecting surfaces is curved.

25. A film as recited in claim 24, wherein the curved portion of the one of the first reflecting surfaces is paraboloidal.

26. A film as recited in claim 23, wherein at least one of the first reflecting surfaces includes two or more rectilinear portions disposed at different angles relative to the optical axis.

27. A film as recited in claim 23, wherein a first separation distance between a first pair of adjacent structures is different from a second separation distance between a second pair of adjacent structures.

28. A film as recited in claim 23, wherein an inclusion angle is defined for each of the structures, different structures having different inclusion angles.

29. A film as recited in claim 23, wherein the first reflecting surfaces are arranged to internally reflect light propagating in a direction approximately parallel to the optical axis within the first layer, the reflected light propagating in directions substantially parallel to a first dispersion plane.

30. A film as recited in claim 29, wherein the structures have second reflecting surfaces oriented to reflect light, propagating in a direction approximately parallel to the optical axis within the first layer, in directions parallel to a second dispersion plane perpendicular to the first dispersion plane.

31. A film as recited in claim 23, wherein the second material is a light absorbing material.

32. A film as recited in claim 23, wherein the structures are formed in the first layer as parallel members extending over substantially an entire width of the first layer.

33. A film as recited in claim 23, wherein the first layer includes diffusing portions positioned at the optically transmitting areas of the second side.

34. A film as recited in claim 33, wherein the diffusing portions include a scattering surface on the second side to scatter light propagating through the optically transmitting areas.

35. A film as recited in claim 33, wherein the diffusing portions include a bulk diffusing portion extending from the second side at least part way into the first layer.

36. A film as recited in claim 33, wherein light diffusing particles are disposed throughout the first material.

37. A film as recited in claim 23, further comprising a substrate layer attached to the second side of the first layer.

38. A film as recited in claim 37, wherein the first reflecting surfaces are arranged to reflect light, propagating in a direction approximately parallel to the optical axis within the first layer, in directions substantially parallel to a first dispersion plane, and at least one of the surfaces of the substrate layer is structured to disperse light in at least a direction parallel to a second dispersion plane perpendicular to the first dispersion plane.

39. A film as recited in claim 23, further comprising a Fresnel lens disposed to reduce divergence of light entering the first side of the first layer.

40. A film as recited in claim 23, further comprising an image light source disposed to illuminate the first side of the first layer with image light.

41. A film as recited in claim 23, wherein different structures are arranged with structure apexes directed in different directions.

42. A light dispersing film for a rear projection screen, comprising:
  a first layer formed from a first material having a first refractive index, the first layer having first and second opposing sides and a first optical axis normal to the first side,
  the first layer including structures formed from a second material having a second refractive index smaller than the first refractive index, the structures having bases at the second side with one or more side walls extending towards the first side to define first reflecting surfaces, the structure bases including a light absorbing material, optically transmitting areas of the second side being defined between the structure bases,
  the first reflecting surfaces forming surfaces disposed at two or more angles relative to the optical axis, a first structure defining a first inclusion angle different from a second inclusion angle defined by a second structure, a bisector of the first inclusion angle being parallel to a bisector of the second inclusion angle, and
  wherein all light reflected by the first reflecting surfaces is reflected at dielectric-dielectric interfaces.

43. A film as recited in claim 42, wherein at least one of the first reflecting surfaces is curved.

44. A film as recited in claim 42, wherein at least one of the first reflecting surfaces includes two or more rectilinear portions disposed at different angles relative to the optical axis.

45. A film as recited in claim 42, wherein a first separation distance between a first pair of adjacent structures is different from a second separation distance between a second pair of adjacent structures.

46. A film as recited in claim 42, wherein the second material is a light absorbing material.

47. A film as recited in claim 42, wherein the structures are formed in the first layer as parallel members extending over substantially an entire width of the first layer.

48. A film as recited in claim 42, wherein the first layer includes diffusing portions positioned proximate the optically transmitting areas of the second side.

49. A film as recited in claim 48, wherein the diffusing portions include a scattering surface on the second side to scatter light propagating through the optically transmitting areas.

50. A film as recited in claim 49, wherein the diffusing portions include a bulk diffusing portion extending from the second side at least part way into the first layer.

51. A film as recited in claim 42, wherein light diffusing particles are disposed throughout the first material.

52. A film as recited in claim 42, further comprising a substrate layer attached to the second side of the first layer.

53. A film as recited in claim 42, wherein the first reflecting surfaces are arranged to reflect light, propagating in a direction approximately parallel to the optical axis within the first layer, in directions substantially parallel to a first dispersion plane, and at least one of the surfaces of the substrate layer is structured to disperse light in at least a direction parallel to a second dispersion plane perpendicular to the first dispersion plane.

54. A film for a rear projection screen, comprising:

a substrate layer, having a first substrate layer side;

structures, formed from a first material having a first refractive index, having structure bases disposed on the first substrate layer side, sidewalls of the structures extending in directions away from the substrate, structure bases being formed of light absorbing material, and clear areas being defined on the first substrate layer side between the structure bases; and an overlayer, formed from a second material having a second refractive index larger than the first refractive index, disposed over the structures and the clear areas of the first substrate layer side, interfaces between the overlayer and the sidewalls forming internally reflecting surfaces for light propagating within the overlayer towards the substrate in a direction substantially perpendicular to the substrate, the overlayer including diffusing particles.

55. A film as recited in claim 54, wherein the reflecting surfaces form reflecting units that asymmetrically disperse light through respective clear areas on the first substrate layer side.

56. A film as recited in claim 54, wherein the reflecting surfaces are disposed to reduce non-uniformity of light dispersion.

57. A film as recited in claim 54, wherein the internally reflecting surfaces are disposed at two or more angles relative to an optical axis of the film.

58. A film as recited in claim 54, wherein at least one of the internally reflecting surfaces is curved.

59. A film as recited in claim 54, wherein at least one of the internally reflecting surfaces includes two or more rectilinear portions disposed at different angles relative to the optical axis.

60. A film as recited in claim 54, wherein a first separation distance between a first pair of adjacent structures is different from a second separation distance between a second pair of adjacent structures.

61. A film as recited in claim 54, wherein the structures are formed from light absorbing material.

62. A film as recited in claim 54, wherein the structures form parallel members extending substantially across the substrate layer.

63. A film as recited in claim 54, wherein the diffusing particles are disposed within the overlayer proximate the clear areas.

64. A film as recited in claim 54, wherein the diffusing particles are disposed throughout the overlayer.

65. A method of manufacturing an optical film, comprising:

casting and curing structures on a substrate, the structures being formed from a first material having a first refractive index and with optically absorbing bases on the substrate, open substrate areas being defined between adjacent structures on the substrate;

overcoating the structures and the open substrate areas with a second material having a second refractive index greater than the first refractive index, so as to form reflecting surfaces at interfaces between the first and second materials, the reflecting surfaces disposed to reflect light, propagating through the second material in a direction substantially parallel to an optical axis of the film, towards open substrate areas.

66. A light dispersing film for a rear projection screen, comprising:

a first layer formed from a first material having a first refractive index, the first layer having first and second opposing sides and a first optical axis normal to the first side, the first layer including structures formed from a second material having a second refractive index smaller than the first refractive index, the structures having bases at the second side with at least two side walls extending towards the first side, internal reflecting surfaces being formed by interfaces between the first and second materials, the structure bases including a light absorbing material, optically transmitting areas of the second side being defined between the structure bases, at least one structure having at least one of the two sidewalls disposed at an angle selected to be parallel to diverging light passing through the film from an image light source positioned on the first optical axis.

67. A film as recited in claim 66, further comprising an imaging light source transmitting diverging image light towards the first layer.

68. A light dispersing film for a rear projection screen, comprising:

a first film having first and second opposing sides, and having a first refractive index within a first refractive index range, the first film including structures formed from a structure material having a second refractive index less than the first refractive index range, the structures having bases at the second side with one or more side walls extending towards the first side, first internal reflecting surfaces being formed by interfaces between the structure material and material of the first film, the structure bases including a light absorbing material, optically transmitting areas of the second side being defined between the structure bases, the first refractive index of the first film proximate the first side being different from the first refractive index of the first film proximate the second side.

69. A method of forming an optical film, comprising:

casting and curing structures on a substrate, the structures being formed from a first material and with optically absorbing bases on the substrate, open substrate areas being defined between adjacent structures on the substrate;

disposing a metallic layer over at least part of the structures to form reflecting surfaces, the reflecting surfaces being disposed to reflect light, propagating through second material substrate in a direction substantially parallel to an optical axis of the film, towards open substrate areas; and overcoating the metallic layer and the open substrate areas with a second material.

* * * * *